US008635783B2

(12) United States Patent
McDonnell et al.

(10) Patent No.: US 8,635,783 B2
(45) Date of Patent: Jan. 28, 2014

(54) SURFACE MEASUREMENT INSTRUMENT AND METHOD

(75) Inventors: Ivor McDonnell, Leicester (GB); Paul James Scott, Leicester (GB); Daniel Ian Mansfield, Leicester (GB)

(73) Assignee: Taylor Hobson Limited, Leicester (GB)

( * ) Notice: Subject to any disclaimer, the term of this patent is extended or adjusted under 35 U.S.C. 154(b) by 143 days.

(21) Appl. No.: 13/124,547

(22) PCT Filed: Oct. 15, 2009

(86) PCT No.: PCT/GB2009/051384
§ 371 (c)(1),
(2), (4) Date: Jul. 11, 2011

(87) PCT Pub. No.: WO2010/043906
PCT Pub. Date: Apr. 22, 2010

(65) Prior Publication Data
US 2011/0258867 A1    Oct. 27, 2011

(30) Foreign Application Priority Data

Oct. 17, 2008 (GB) .................................. 0819087.8

(51) Int. Cl.
*G01B 5/004* (2006.01)
(52) U.S. Cl.
USPC ............................................. 33/502; 33/520
(58) Field of Classification Search
USPC ....................... 33/502, 520; 73/1.79
See application file for complete search history.

(56) References Cited

U.S. PATENT DOCUMENTS

| 4,369,581 | A | * | 1/1983 | Lenz ............................... 33/1 M |
| 4,807,152 | A | * | 2/1989 | Lane et al. ..................... 700/247 |
| 4,819,339 | A | * | 4/1989 | Kunzmann et al. ............ 33/503 |
| 5,134,781 | A | * | 8/1992 | Baker ............................. 33/502 |
| 5,373,222 | A | * | 12/1994 | Hemmerle et al. ........... 318/652 |
| 5,740,616 | A | * | 4/1998 | Seddon et al. ................. 33/554 |
| 5,926,781 | A | * | 7/1999 | Scott ............................. 702/151 |
| 6,490,026 | B1 |  | 12/2002 | Watanabe |
| 6,615,503 | B1 |  | 9/2003 | Nzomigni |

(Continued)

FOREIGN PATENT DOCUMENTS

| DE | 3931764 | 4/1991 |
| DE | 4421301 | 12/1995 |

(Continued)

OTHER PUBLICATIONS

International Search Report dated Mar. 10, 2010.
United Kingdom Search Report Feb. 19, 2009.

*Primary Examiner* — Christopher Fulton
(74) *Attorney, Agent, or Firm* — RatnerPrestia

(57) ABSTRACT

A method of determining a correction parameter for use in effecting alignment of a component of a metrological apparatus in at least one direction is described which includes: positioning an artefact on a support surface of a turntable of the metrological apparatus so that a measurement surface of the artefact is asymmetric with respect to a rotation axis of the turntable in the at least one direction; using a measurement probe of the measurement instrument to make a first measurement of the measurement surface; rotating the turntable; using the measurement probe of the measurement instrument to make a second measurement of the measurement surface after rotation of the turntable; and determining a correction parameter from the first and second measurements.

21 Claims, 24 Drawing Sheets

(56) References Cited

U.S. PATENT DOCUMENTS

| | | | |
|---|---|---|---|
| 6,671,973 B2* | 1/2004 | Takemura et al. | 33/551 |
| 7,165,335 B2* | 1/2007 | McMurtry | 33/503 |
| 7,460,970 B2* | 12/2008 | Madlener et al. | 702/94 |
| 7,905,027 B2* | 3/2011 | MacManus | 33/502 |
| 8,006,398 B2* | 8/2011 | McFarland et al. | 33/503 |
| 2001/0008047 A1* | 7/2001 | Okada et al. | 33/503 |
| 2006/0235636 A1 | 10/2006 | Madlener | |
| 2009/0002486 A1 | 1/2009 | Fricke | |

FOREIGN PATENT DOCUMENTS

| | | |
|---|---|---|
| DE | 10122080 | 11/2004 |
| EP | 1519144 | 3/2005 |
| GB | 2060888 | 5/1981 |
| GB | 2189604 | 10/1987 |
| GB | 2241338 | 8/1991 |
| GB | 2422015 | 7/2006 |
| WO | 2004051179 | 6/2004 |

* cited by examiner

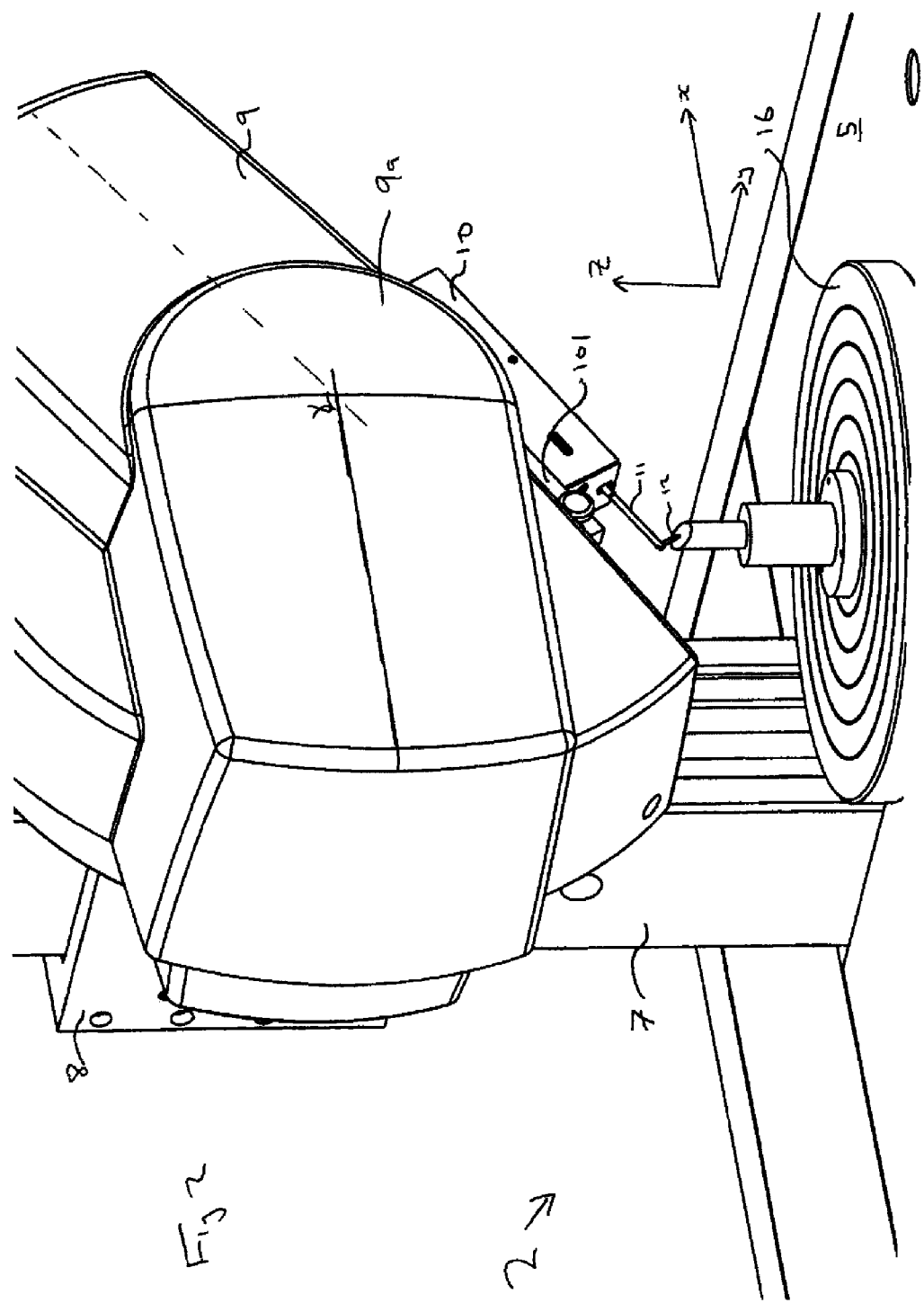

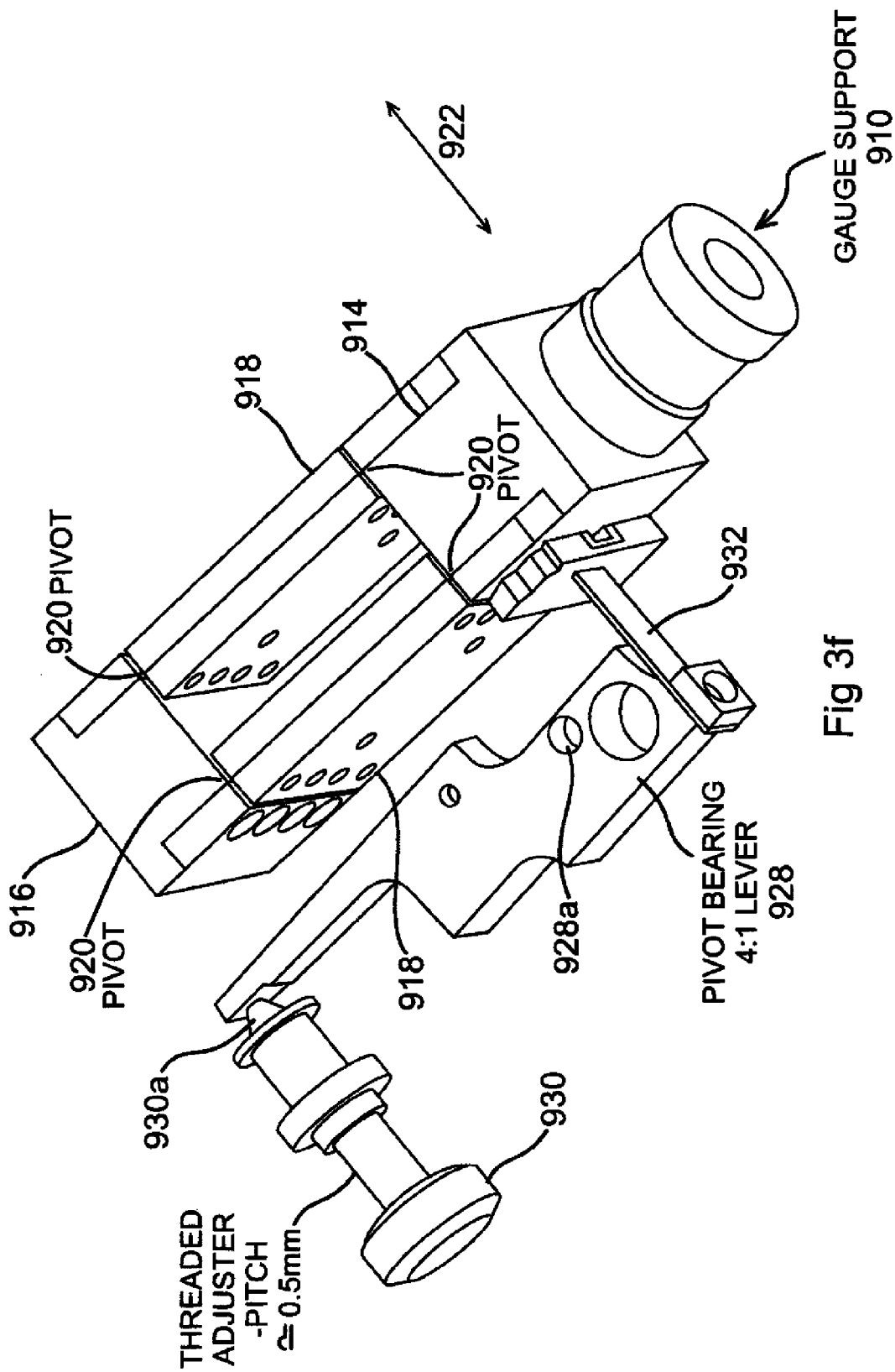

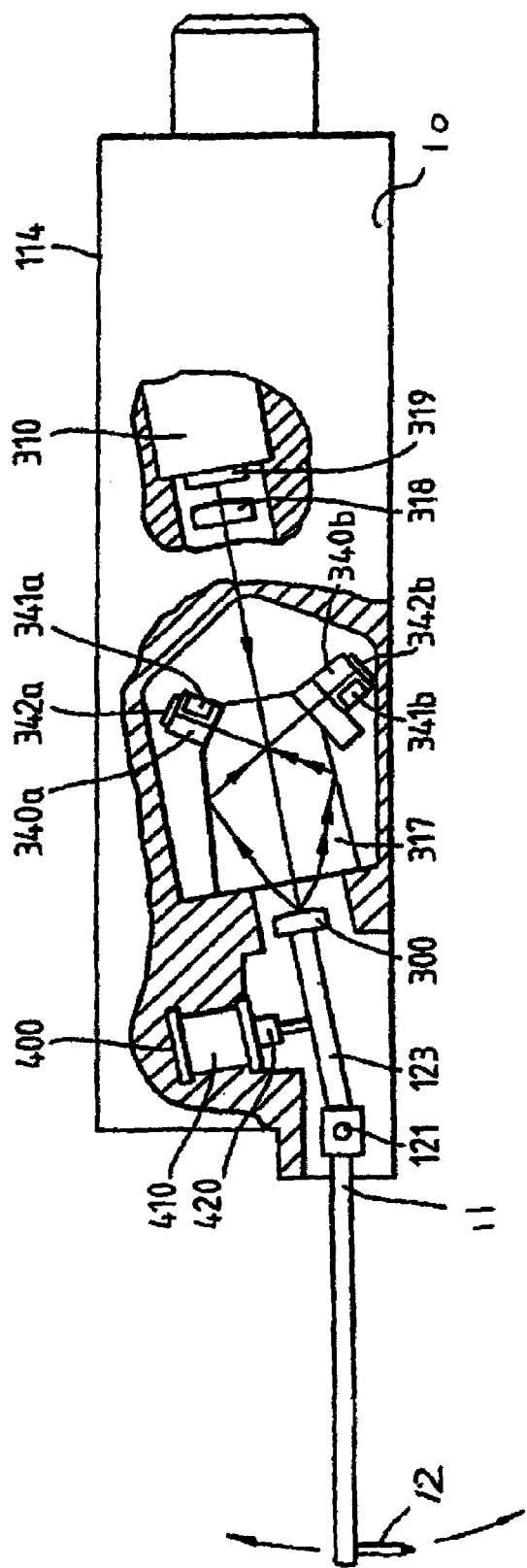

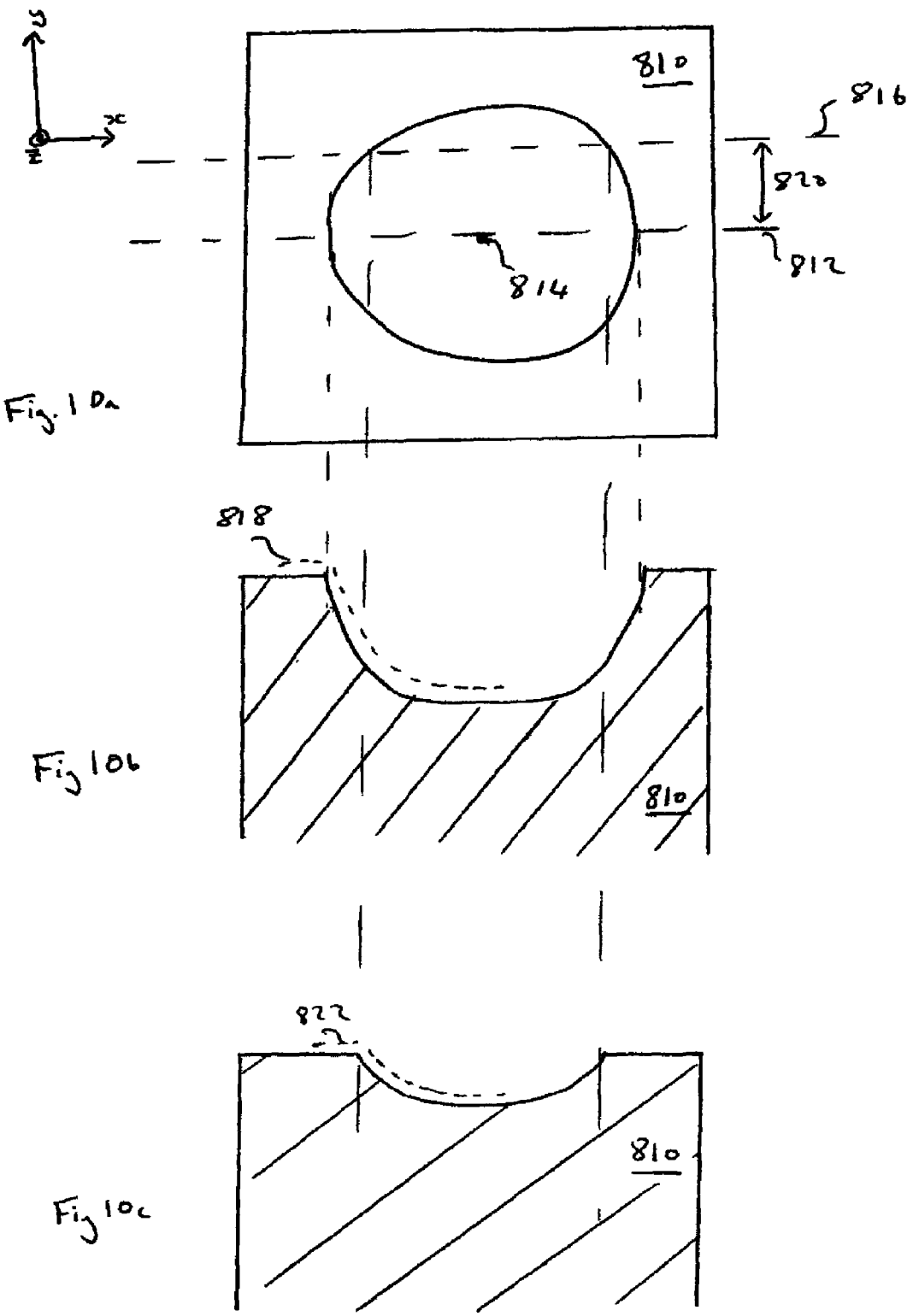

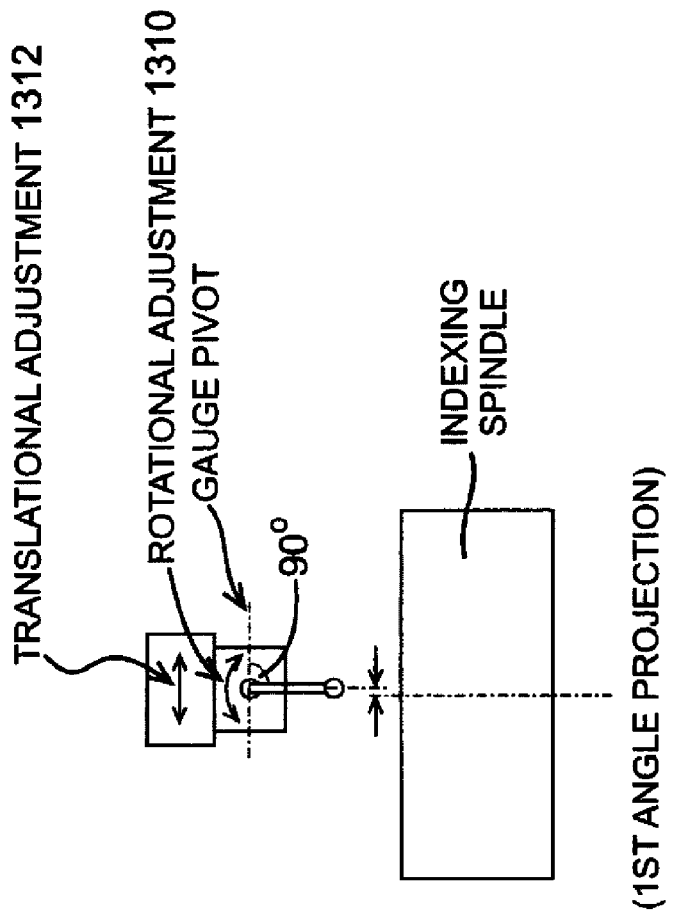
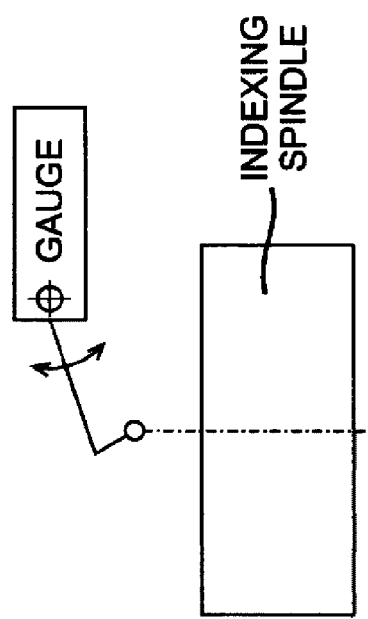
Fig 13b (1ST ANGLE PROJECTION)
Fig 13a

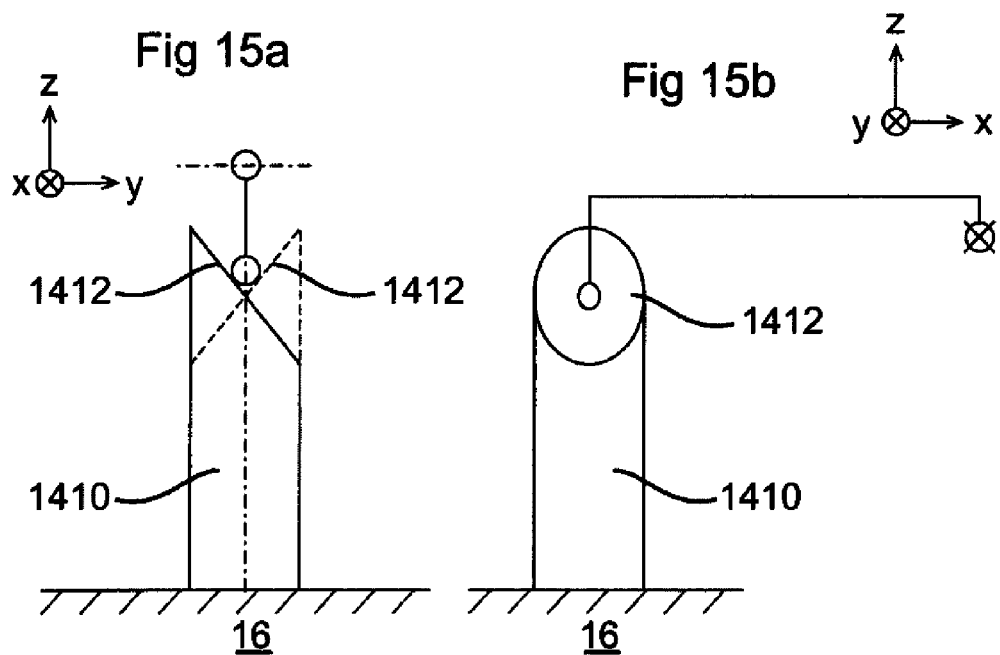
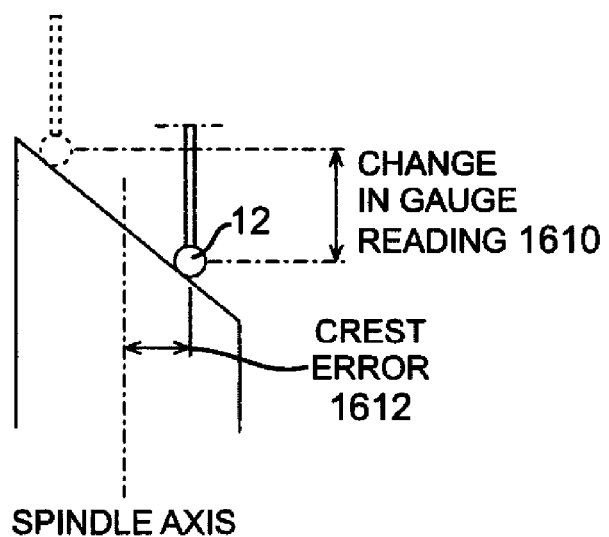

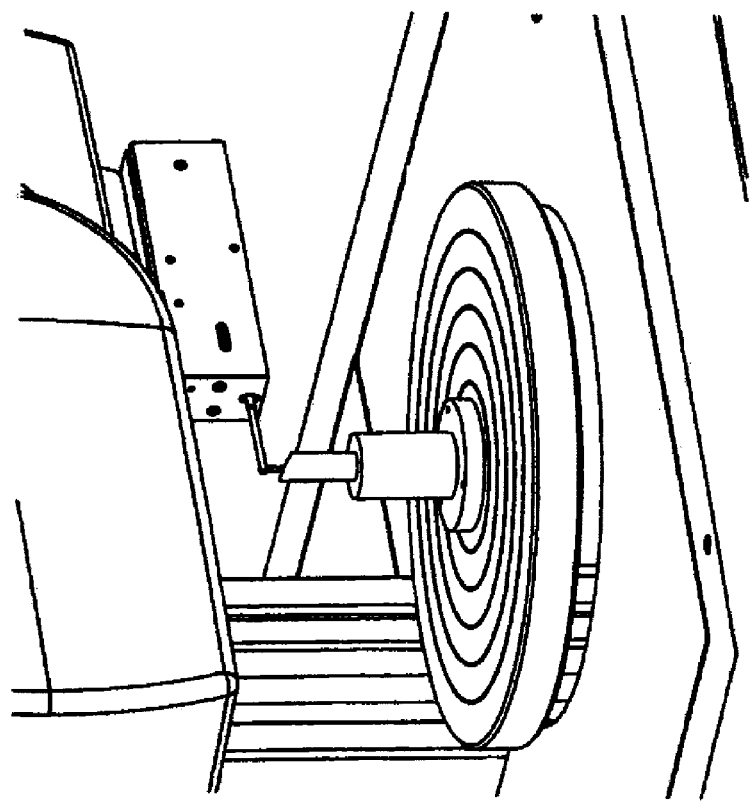
Fig. 17a
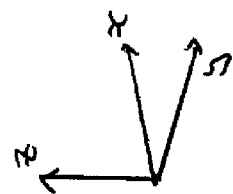

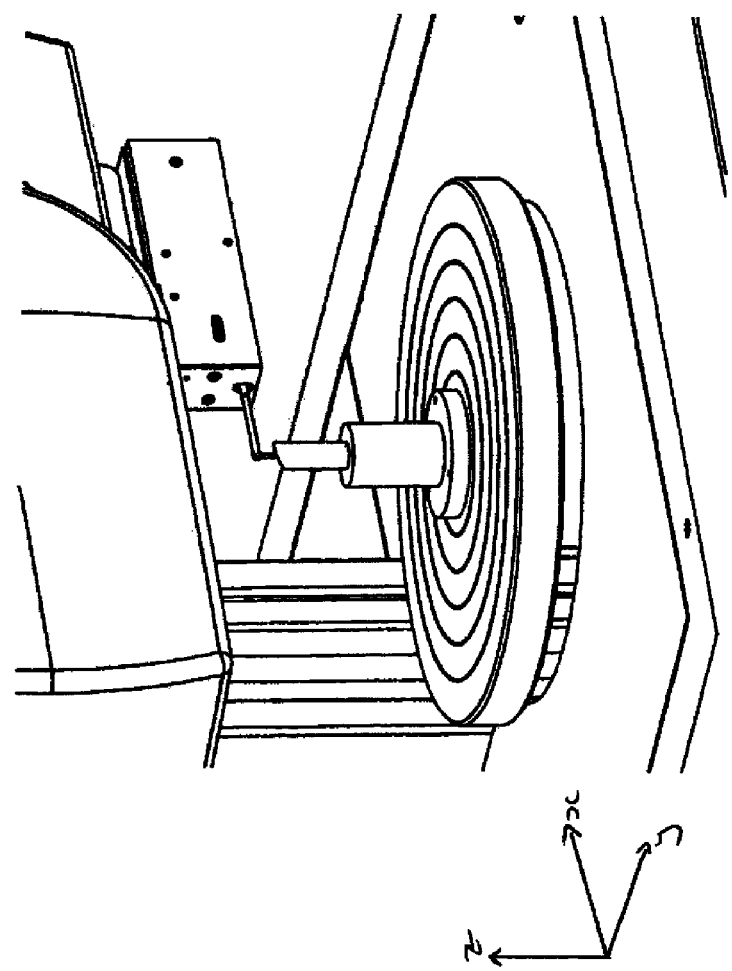

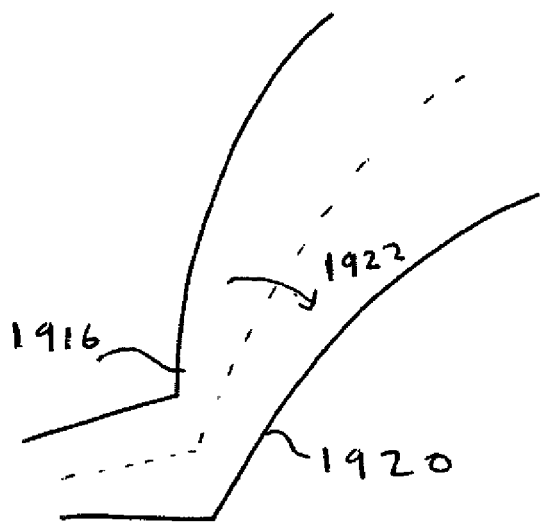
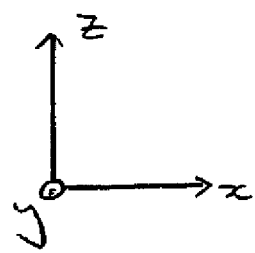
Fig 19d

SURFACE MEASUREMENT INSTRUMENT AND METHOD

THIS APPLICATION IS A U.S. NATIONAL PHASE APPLICATION OF PCT INTERNATIONAL APPLICATION PCT/GB2009/051384, filed Oct. 15, 2009, which is incorporated herein by reference.

The present application claims priority from GB0819087.8 filed 17 Oct. 2008, the whole contents of which are hereby incorporated by reference.

This invention relates to a surface measurement instrument and method for measuring one or more surface characteristics, in particular but not exclusively a surface measuring instrument such as a roundness or flatness measuring instrument.

Taylor Hobson Limited, a division of Ametek Inc., manufactures a number of surface profile or form measuring metrological instruments which use a measurement probe in the form of a mechanical stylus to determine the profile or form of the surface. In many of these instruments, relative movement is effected between the stylus and the component along a measurement path and surface changes in the z direction cause an arm carrying the stylus to pivot or rotate about an axis as the stylus follows these surface changes. A measurement gauge, in this case an interferometric gauge, measures the z displacement.

One type of such a metrological instrument manufactured by Taylor Hobson is the Form Talysurf PGI (Registered Trade Mark) series. This series of instruments has a particularly good range-to-resolution ratio and so is capable of making measurements of both form and surface roughness or texture on surfaces having a significant degree of form. This makes the use of the Form Talysurf PGI series of instruments particularly advantageous for aspheric surface measurement.

In measuring an aspheric component with such a metrological instrument, it is usual that a measurement be taken over a measurement path between opposed points on the surface and passing through a point on the surface through which an axis of rotation of the component extends, so that in the case of an aspheric body having a circular base the measurement path represents a projection of the diameter of the circular base onto the aspheric surface. For this reason the measurement path may be referred to as a "diametral path".

In some circumstances it may not be possible to measure the full diametral path of the component due to physical limitations. These limitations might, for example, be that the component dimensions exceed the measurement envelope of the instrument (for example the diameter is longer than the maximum length over which the measurement instrument can record), or that at least part of the slope or gradient of the component surface is too great.

Typically, the maximum gradient in the x-z plane which can be measured by a Form Talysurf PGI metrological instrument is about 30°, beyond which the stresses applied to the stylus arm may become too great and may induce bending.

Where the surface to be measured is a recessed or concave surface, then another physical constraint may be the dimensions of the measurement probe.

One type of component for which the latter two issues may arise is a mould for small aspheric lenses, particularly lenses for use in digital cameras and mobile telephones because such lenses may have a base diameter in the region of less than 10 millimeters. The issue of surface gradient may also be a problem when measuring the lenses produced by such moulds.

The gradient problem is also becoming increasingly prevalent in the field of lenses for optical storage devices such as Digital Versatile Disc (DVD) recorders and players. This is because, as the demand for increased data storage capacity becomes greater, the optical resolving power of the light used to burn data onto a DVD must become higher. This is being achieved by decreasing the wavelength of the light source from infra-red to blue light. Systems using blue light may, however, require lenses with a greater degree of asphericity and so at least part of the lens surface may have a gradient greater than 30°.

In one aspect, the present invention provides a method of determining a correction parameter for use in effecting alignment of a component of a metrological apparatus in at least one direction, the method comprising: positioning an artefact on a support surface of a turntable of the metrological apparatus so that a measurement surface of the artefact is asymmetric with respect to a rotation axis of the turntable in the at least one direction; using a measurement probe of the measurement instrument to make a first measurement of the measurement surface; rotating the turntable; using the measurement probe of the measurement instrument to make a second measurement of the measurement surface after rotation of the turntable; and determining a correction parameter from the first and second measurements.

In one aspect, the present invention provides a method of determining an alignment correction parameter for centering a workpiece having first and second mirror image surface portions to a rotation axis of a turntable of a metrological apparatus, the method comprising: measuring the form of the first surface portion at a first measurement position to provide first measurement data; rotating the turntable to bring the second surface portion to the first measurement position; measuring the form of the second surface portion at the first measurement position to provide second measurement data; aligning the first and second measurement data using a feature of the form of the first and second surface portions; and determining an alignment correction parameter on the basis of the results of the aligning.

In an embodiment, the workpiece has mirror image third and fourth surface portions and the method further comprises: measuring the form of the third surface portion of the workpiece at a measurement position to provide third measurement data; rotating the turntable to bring the fourth surface portion of the workpiece to that measurement position; measuring the form of the fourth surface portion at that measurement position to provide fourth measurement data; aligning the third and fourth measurement data using a feature of the form of the third and fourth surface portions; and determining another alignment correction parameter on the basis of the results of the aligning.

In one aspect, the present invention provides metrological apparatus comprising: a turntable; means for determining a correction parameter for use in effecting alignment of a component of the metrological apparatus in at least one direction; an artefact mounted on a support surface of the turntable of the metrological apparatus so that a measurement surface of the artefact is asymmetric with respect to a rotation axis of the turntable in the at least one direction; a measurement probe to make measurements on the measurement surface; and means for rotating the turntable, wherein the determining means is arranged to determine the correction parameter from a first measurement of the measurement surface by the measurement probe and a second measurement of the measurement surface by the measurement probe after rotation of the turntable.

In one aspect, the present invention provides metrological apparatus comprising: a turntable to support a workpiece having first and second mirror image surface portions; means for measuring surface form; means for rotating the turntable about a rotation axis; control means for causing the measuring means to measure the form of the first surface portion at a first measurement position to provide first measurement data, the rotating means to rotate the turntable to bring the second surface portion to the first measurement position, and the measuring means to measure the form of the second surface portion at the first measurement position to provide second measurement data; means for aligning the first and second measurement data using a feature of the form of the first and second surface portions; and means for determining an alignment correction parameter to centre the workpiece to the rotation axis on the basis of the results of the aligning.

Embodiments of the present invention will now be described, by way of example, with reference to the accompanying drawings, in which:

FIG. 2 shows a perspective view of a part of a metrological instrument embodying the present invention;

Figure 3A:
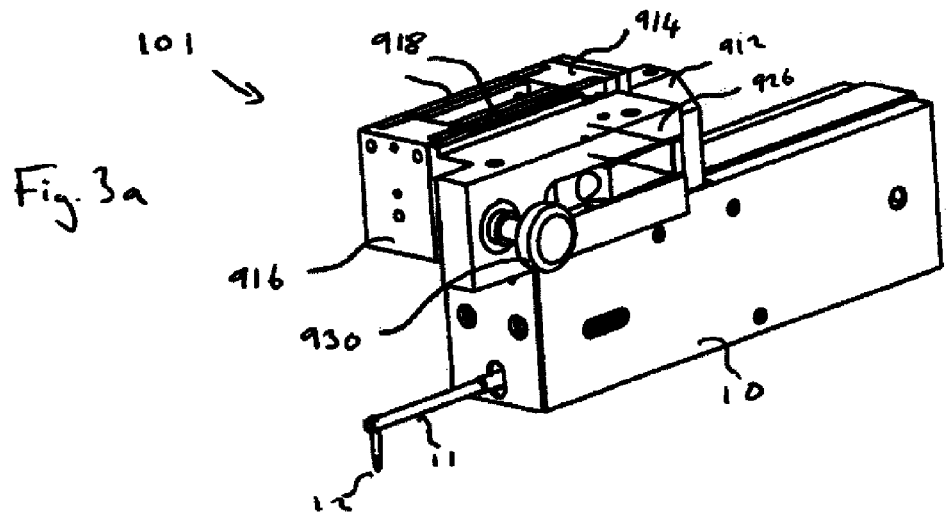
Figure 3B:
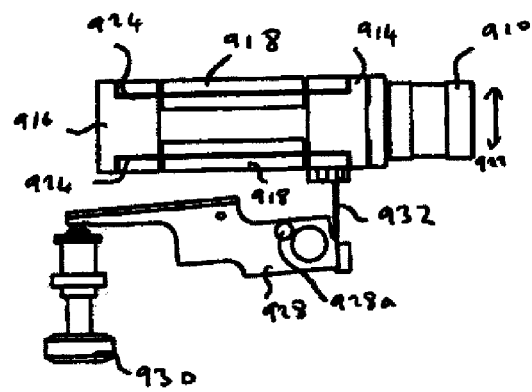
Figure 3C:
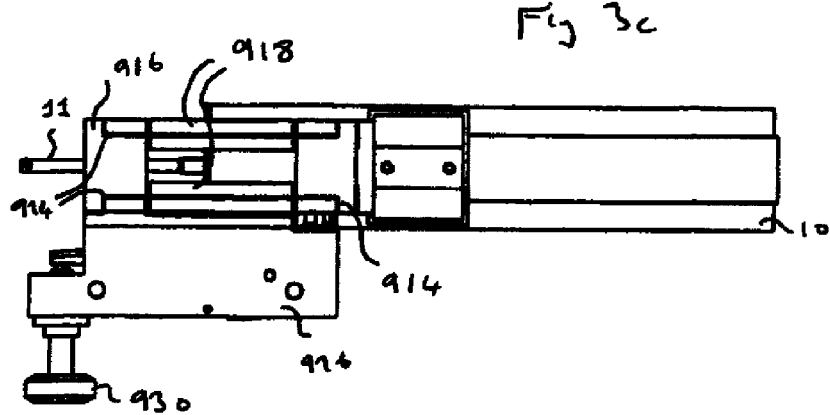
Figure 3D:
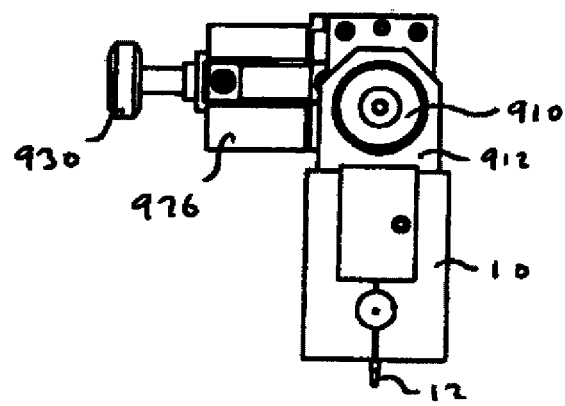
Figure 3E:
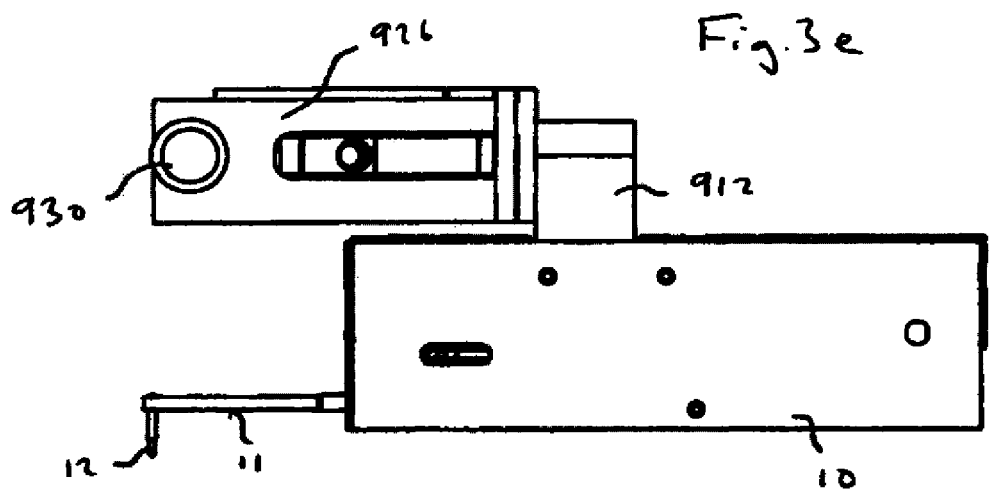
Figure 4A:
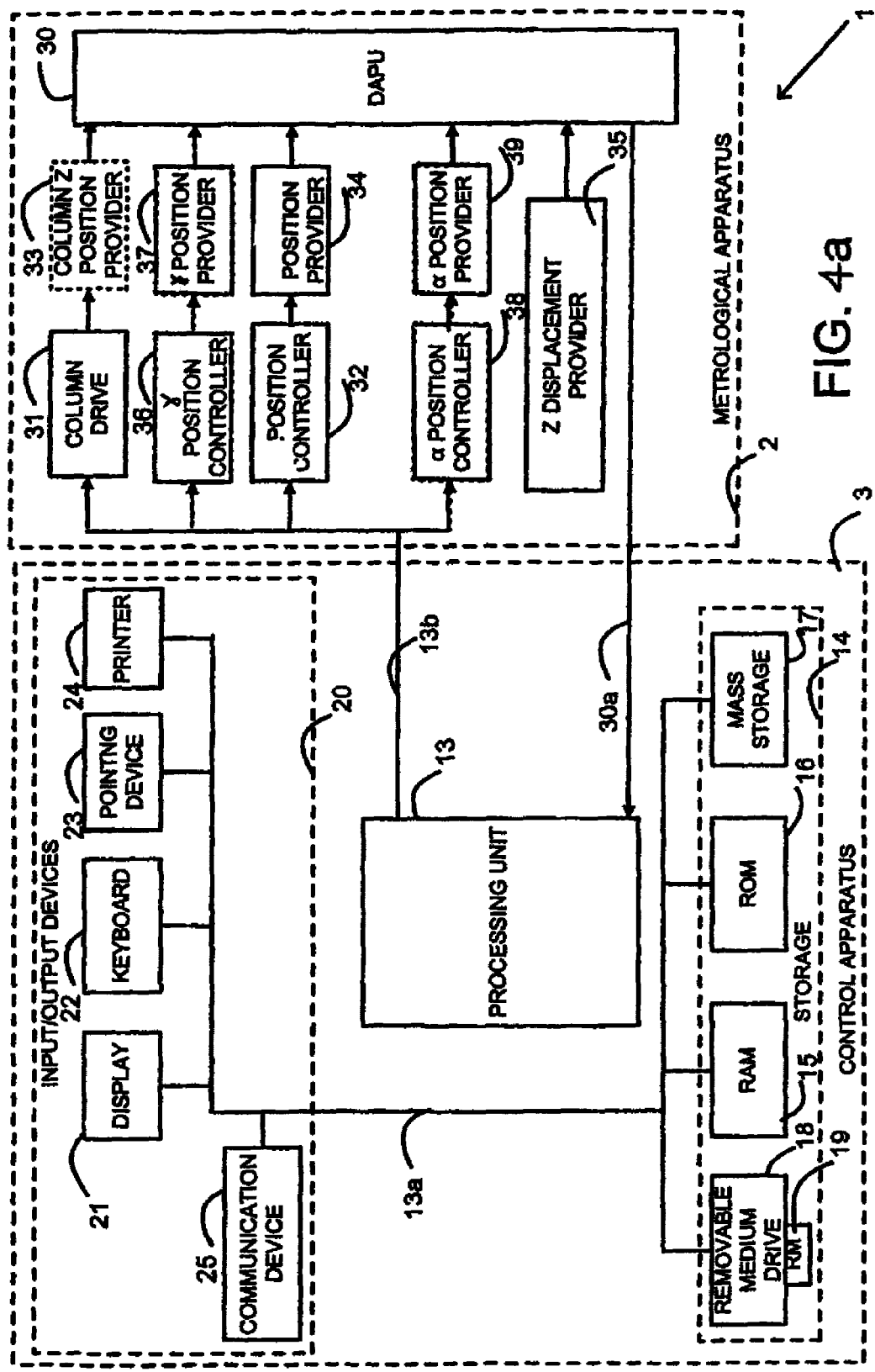
Figure 4B:
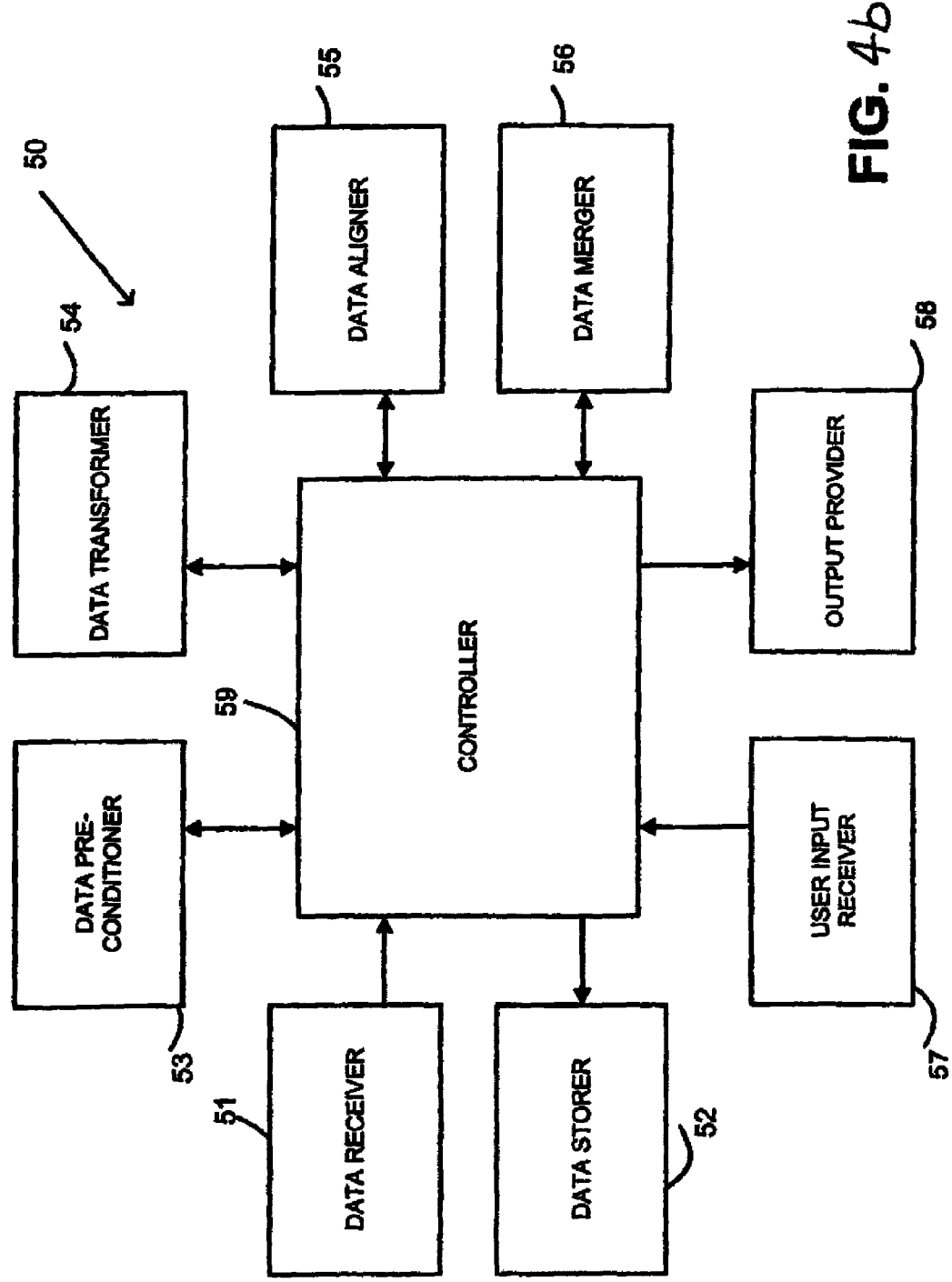
Figure 6:
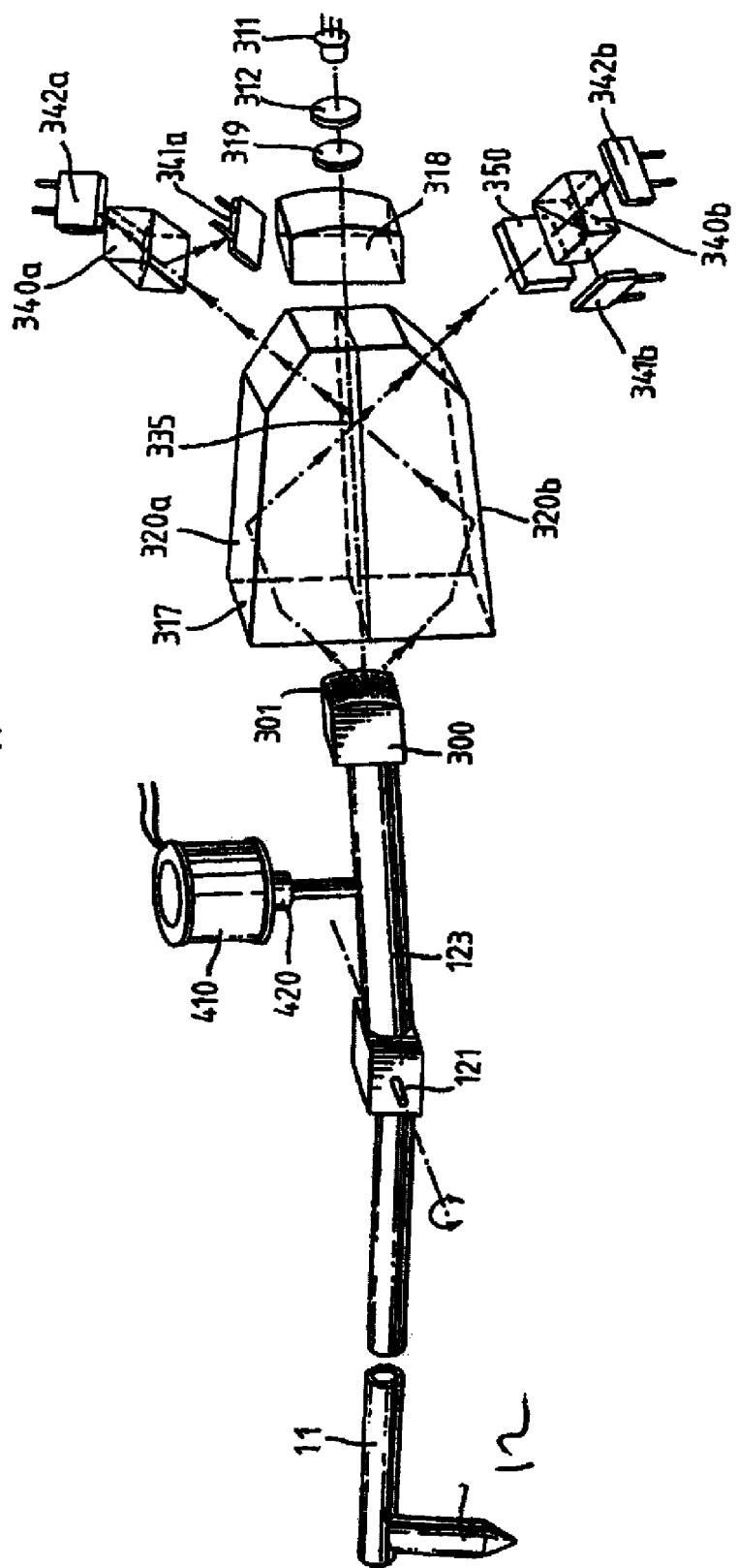
Figure 7:
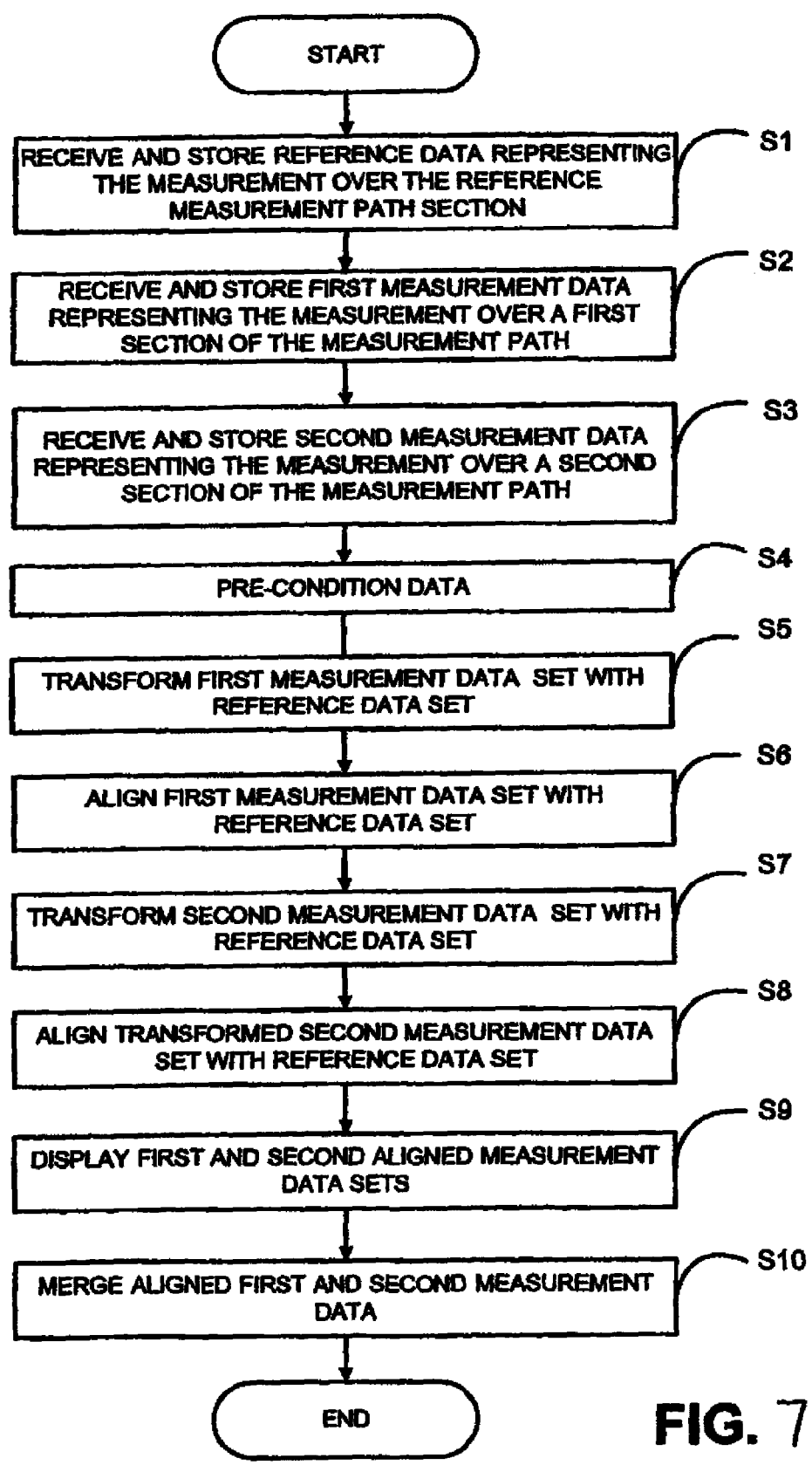
Figure 8A:
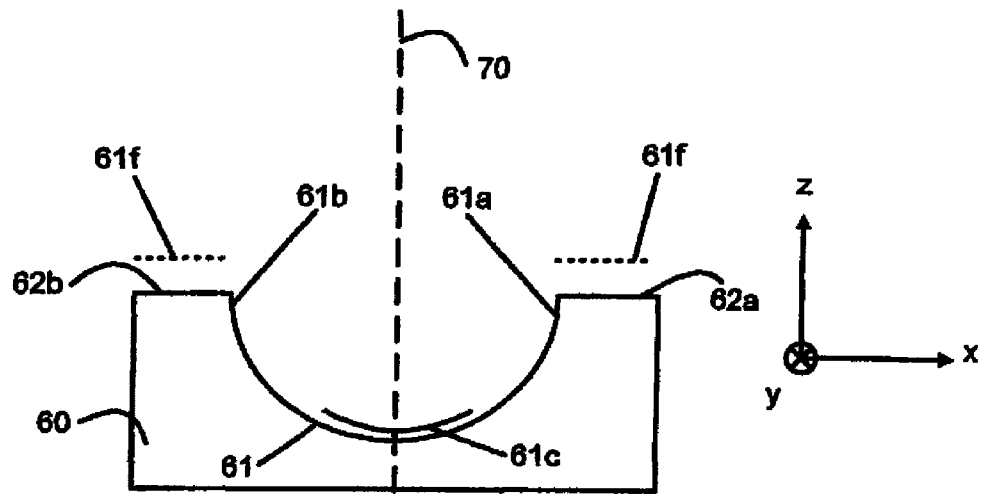
Figure 8B:
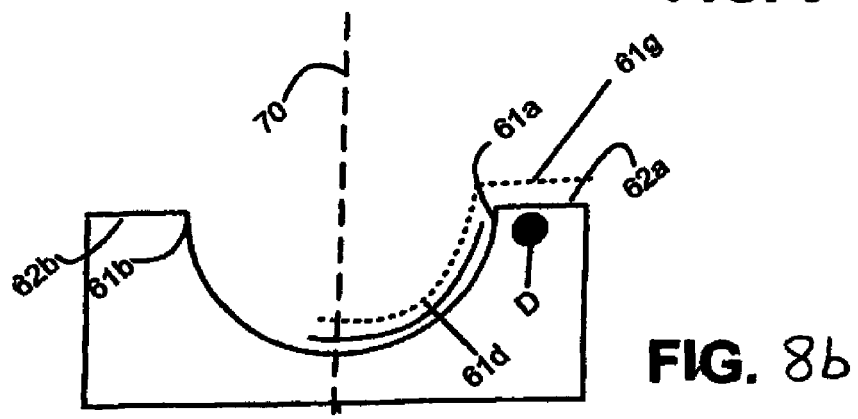
Figure 8C:
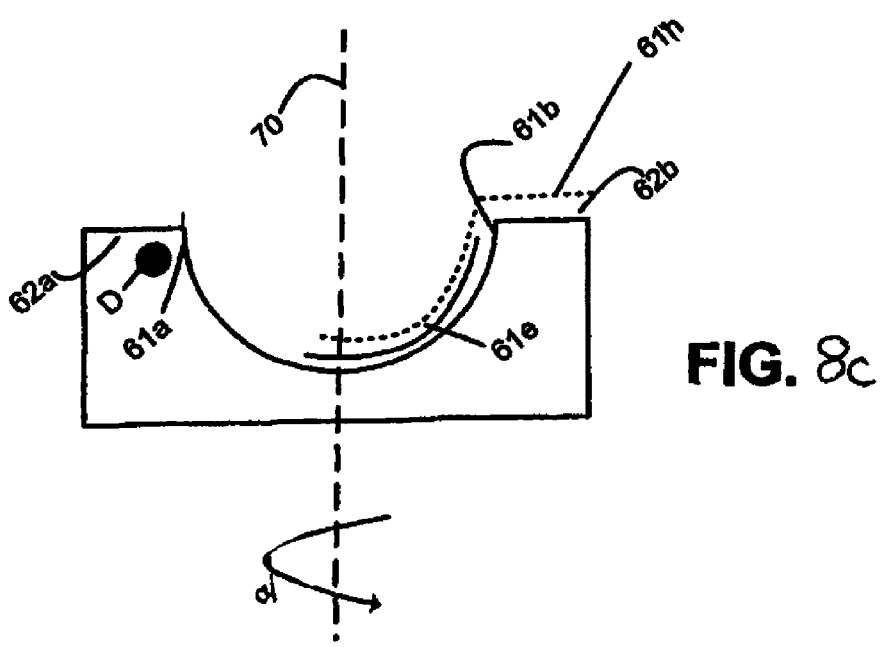
Figure 9A:
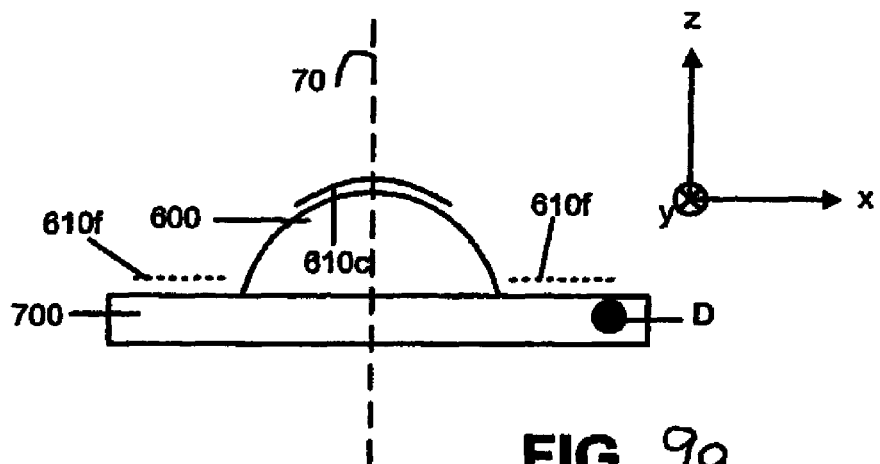
Figure 9B:
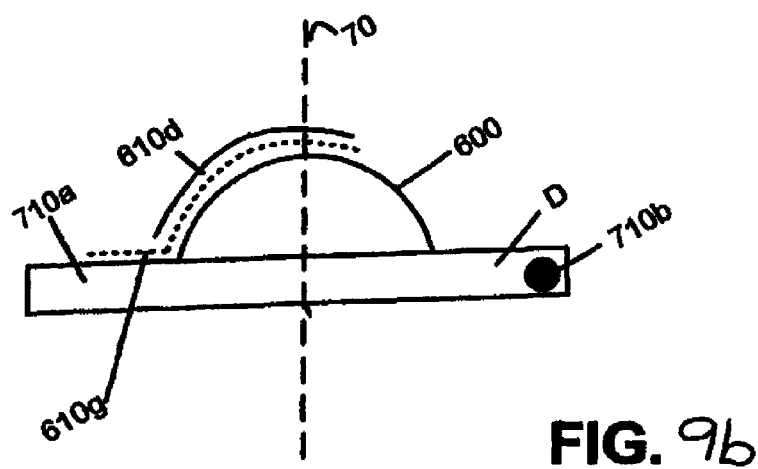
Figure 9C:
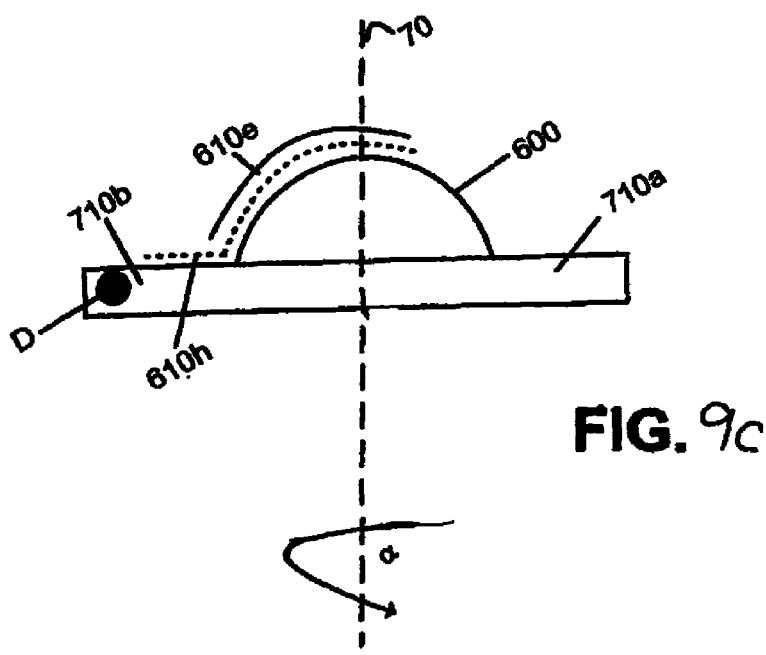
Figure 11:
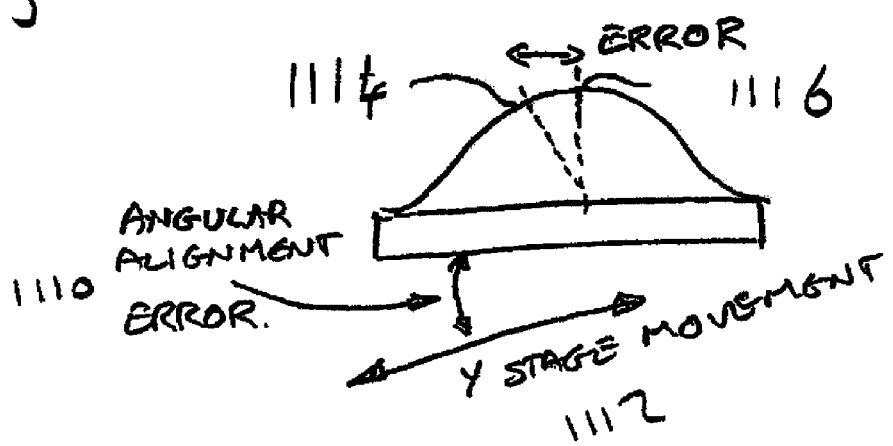
Figure 12:
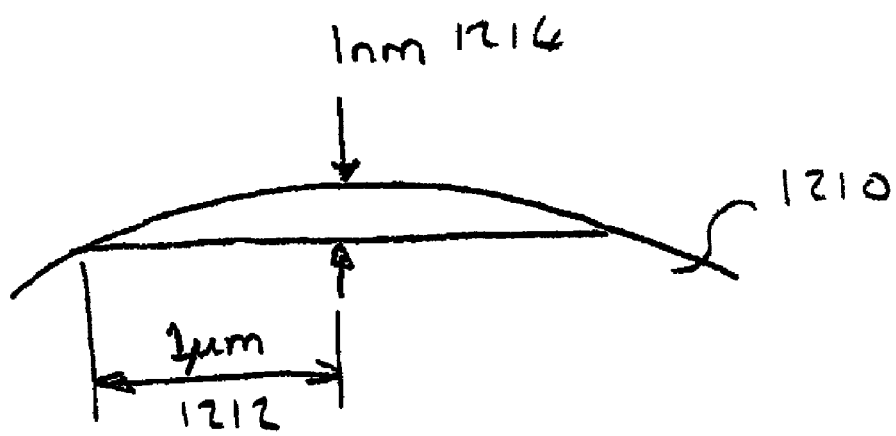
Figure 14:
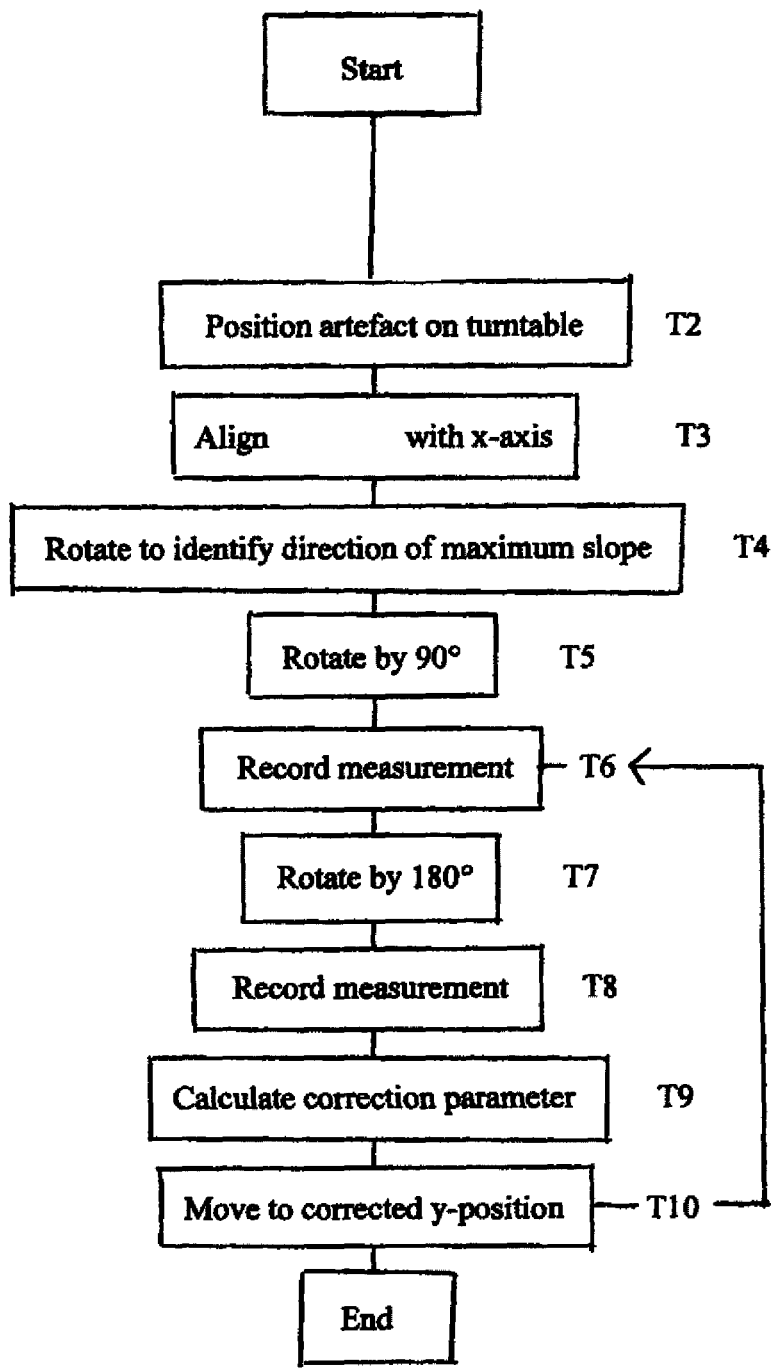

FIGS. 3a to 3f show respectively: a perspective view of a y-position adjuster and probe for the metrological apparatus, a top view of a portion of the y-position adjuster with some components removed, a top view of the y-position adjuster and probe, an end view of the y-position adjuster and probe, a side view of the y-position adjuster and probe, and a perspective view of the components of FIG. 3b;

FIG. 4a shows a block diagram of functional components of a measuring apparatus;

FIG. 4b shows a block diagram of functional components provided by programming of the processing unit of FIG. 4a;

FIG. 5 shows a side view of a measurement probe partially cutaway to show components of the probe;

FIG. 6 shows an exploded perspective view of a portion of FIG. 5;

FIG. 7 shows a flow chart for illustrating steps carried out by the control apparatus in a method embodying the invention for determining the form of a workpiece using the metrological instrument;

FIGS. 8a to 8c show schematic representations illustrating the traces taken on a workpiece in the form of a lens mould during a measurement operation;

FIGS. 9a to 9c show schematic representations illustrating the traces taken on a workpiece in the form of an aspheric lens during a measurement operation;

FIGS. 10a to 10c show diagrammatic representations of traces of an astigmatic lens mould taken both on and off an axis of symmetry of the lens;

FIG. 11 illustrates very diagrammatically how errors in the y-direction translation alignment result in incorrect crest determination;

FIG. 12 illustrates very diagrammatically the relationship between cresting errors and vertical movement;

FIGS. 13a and 13b show diagrams to illustrate the two degrees of freedom by which the measurement probe may need to be adjusted in order to bring it into alignment with a spindle axis of a turntable of the metrological apparatus;

FIG. 14 shows a flow chart illustrating steps carried out by the control apparatus to determine the y-direction alignment using an artefact having an inclined surface;

FIGS. 15a and 15b show the artefact being measured at a plurality of different angular positions;

FIG. 16 illustrates how cresting error is related to the change in measurement probe reading when a first reading is taken on the inclined plane of the artefact at a first rotational position of a turntable of the metrological apparatus and the turntable is rotated by 180° before a second reading is taken of the inclined plane;

FIGS. 17a to 17d show perspective views of a part of a metrological instrument with its stylus contacting the artefact's inclined plane, the artefact being in a plurality of different rotational positions relative to the instrument;

FIGS. 18a to 18d show an example artefact having an inclined plane from respectively: front, top, perspective, and side views; and FIGS. 19a to 19d show: a workpiece at a first rotational position with a corresponding trace, a workpiece at a second rotational position with a corresponding trace, a plan view of the workpiece showing the locations at which the traces were taken, and the traces shown adjacent one another.

With reference to the drawings in general, it will be appreciated that the Figures are not to scale and that for example relative dimensions may have been altered in the interest of clarity in the drawings. Also any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Overview

Referring now to the drawings, an example metrological instrument will be described which comprises a metrological apparatus and a control apparatus.

Figure 1:
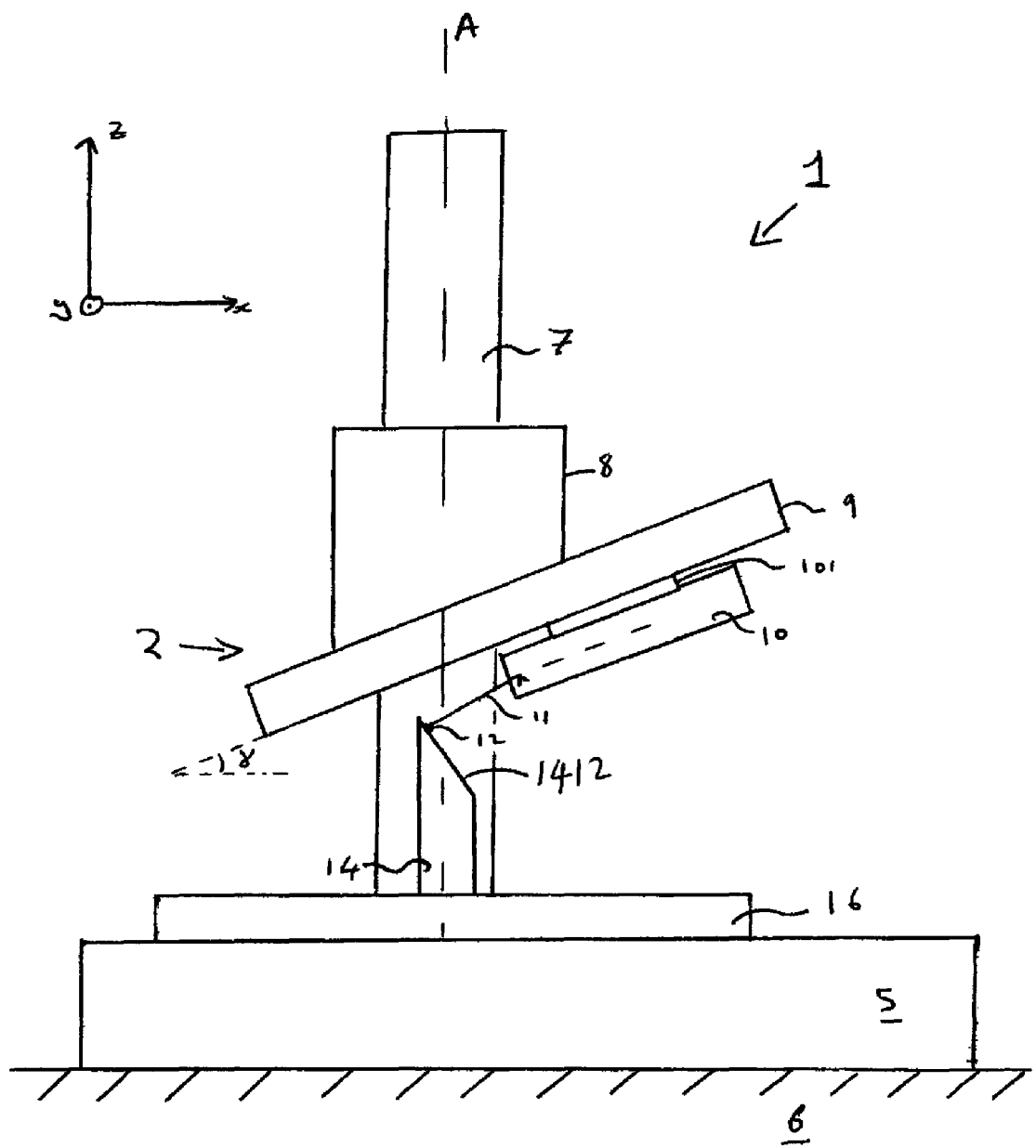
FIG. 1 shows a very schematic representation of a metrological instrument embodying the present invention looking in a direction perpendicular to a measurement direction.

FIG. 1 shows a very diagrammatic representation of the metrological apparatus 2 of the metrological instrument 1 looking generally in a y direction (that is the direction perpendicular to a measurement or x direction). It will be appreciated that FIG. 1 is not to scale.

The metrological apparatus 2 has a base 5 (generally formed of cast iron) that is designed to be supported by a workbench 6. The base 5 carries a column 7 that defines a vertical or z axis reference datum. A column carriage 8 is mounted to the column 7 so as to be movable in the z direction with respect to the column 7. The movement of the column carriage 8 is effected by a motorised leadscrew, pulley or other drive arrangement (not shown). The base 5 also carries turntable 16 to support a workpiece 14. The turntable 16 has a centering and levelling mechanism (not shown) such as that shown in FIGS. 2 and 3 of GB2,189,604A, the whole contents of which are hereby incorporated by reference.

The column carriage 8 carries a traverse unit 9, which is arranged at an angle γ to the x-axis (which in the example shown is horizontal) and is movable relative to the column carriage 8 in a direction at an angle γ to the x-axis by means of a motorised drive arrangement (not shown) along a straight reference datum (not shown) provided by the traverse unit 9.

The traverse unit 9 carries a measurement probe (or gauge unit) 10 which, in this embodiment, consists of a pivotally mounted stylus arm (shown very diagrammatically in FIG. 1 in dotted lines within the traverse unit 9) carrying at its free end a stylus arm 11 having a stylus tip 12 which in operation comes into contact with the surface of the workpiece or component under test during a measurement operation so that, as the traverse unit 9 is moved in the measurement direction, the stylus arm 11 pivots to enable the stylus tip 12 to follow variations in the z direction (or, if γ is non-zero, in a direction at an angle γ to the x-axis) along a measurement path on the surface. The measurement probe 10 is mounted to the traverse unit 9 by a y-position adjuster 101 so as to be movable in the y-direction with respect to the traverse unit 9. The movement of the measurement probe 10 in the y-direction may be effected by a manual or motorised leadscrew, pulley or other drive arrangement (not shown).

FIG. 2 shows a perspective view of part of an example a metrological apparatus (of a metrological instrument) embodying the present invention illustrating in greater detail the mounting of the traverse unit 9 to the column carriage 8. In this example, the traverse unit 9 is mounted to the column carriage 8 by means of a pivot pin (hidden beneath the cover 9a in FIG. 2) to enable the angle γ of the traverse unit 9 with respect to the x-axis to be adjusted. In this particular example, the angle γ of the traverse unit 9 is manually adjustable and the traverse unit 9 is held in place at the manually adjusted angle by means of an air brake (not visible in the Figure). As another possibility, the adjustment of the angle γ may be automated. As another possibility, the angle γ may for some applications be fixed.

Y-Position Adjustment

The y-position of the measurement probe is adjustable by means of a y position adjustor coupling the measurement probe or gauge unit to the traverse unit. Again the adjustment may be manual or may be automated.

FIGS. 3a to 3f illustrate one example of a y-position adjustor. In this example, the measurement probe 10 is coupled to the traverse unit 9 by a y-position adjuster 101 which provides a parallelogram linkage between the probe 10 and the traverse unit 9.

The parallelogram linkage is provided by a pair of parallel resilient ligaments 924 connected at one end to a block 916 coupled to the traverse unit and at the other end to a block 914 coupled to the measurement probe or gauge unit 10. Each resilient ligament 924 is trapped or sandwiched within one of a pair of parallel arms 918 so that only a small extent of the ligaments is free at each end of the arms 918. The ligaments may be of steel sheet approximately 0.2 mm thick. The free portions of the ligaments provide pivots 920 that allow block 914 to move relative to block 916 in a direction along arrow 922 (FIG. 3f) which corresponds to the y direction in FIGS. 1 and 3. Accordingly, flexion of the parallelogram linkage allows the probe 10 to move relative to the traverse unit 9 along arrow 22, thereby changing the y-position of the probe.

To allow y-position adjustment, the y-position adjuster 101 further comprises an adjustment mechanism having a housing 926, a pivot bearing lever 928 and a manually operable adjustor 930. In this example the manually operable adjustor 930 is a thumbwheel having a threaded shaft received in a threaded hole (not shown) of block 916. The end 930a of the threaded shaft remote from the thumbwheel bears on a pivot bearing lever 928 which is biased thereagainst by a spring (not shown). Rotation of the thumbwheel 930 causes the threaded shaft to be screwed into and out of the threaded hole of the housing 926 and so causes the pivot bearing lever 928 to pivot about its pivot point 928a and so cause the block 914 (which is connected to pivot bearing lever 928 by ligament 932) to move in a direction along arrow 922.

Selection of the relative distance between pivot point 928a of pivot bearing lever 928 and ligament 932 with respect to the distance between pivot point 928a and the point at which end 930a of the manually operable adjustor 930 bears onto pivot bearing lever 928—for example a ratio of four to one—may advantageously reduce the distance in direction 922 that block 914 translates for every turn of the manually operable adjustor 930, thereby allowing very fine tuning As one possibility, the manually operable adjustor 930 has a screw pitch of around 0.5 mm.

Although as described above a manual y position adjustment is provided, it may be possible to automate the y position adjustment.

Control Apparatus

FIG. 4a shows a block diagram illustrating the main functional components of both the metrological apparatus 2 and the control apparatus 3 of the metrological instrument 1 while FIG. 4b shows a block diagram of functional components provided by programming of the control apparatus 3.

Referring now to FIG. 4a, the control apparatus 3 is generally a personal computer and has a processing unit 13 coupled via a bus 13a to associated data and program instruction/software storage 14 in the form of RAM 15, ROM 16, a mass storage device 17 such as a hard disc drive and at least one removable medium drive 18 for receiving a removable medium (RM) 19, such as a CD-ROM, solid state memory card, DVD, or floppy disc. As another possibility, the removable medium drive may itself be removable, for example it may be an external hard disc drive.

The control apparatus is also coupled via the same or a different bus to input/output devices 20 comprising a display 21, a keyboard 22, a pointing device 23 such as a mouse, a printer 24 and, optionally, a communications device 25 such as at least one of a MODEM and a network card for enabling the control apparatus 3 to communicate signals S via a wired or wireless connection with other control apparatus or computers via a network such as the Internet, an intranet, a WAN or a LAN.

The processing unit 13 is programmed by program instructions and data provided by being at least one of: downloaded as a signal S via the communications device 25; pre-stored in any one or more of ROM 16, RAM 15 and mass storage device 17; read from a removable storage medium 19 received by the removable medium drive 18; and input by the user using the keyboard 22.

The metrological apparatus 2 has a data acquisition and processing unit (DAPU) 30 that communicates with the processing unit 13 of the control apparatus 3 via an appropriate link, for example a serial link, 30a to enable data regarding a measurement operation to be communicated to the control apparatus 3.

The control components of the metrological apparatus 2 comprise a column drive controller 31 for driving the carriage 8 up and down the column in the z direction, a measurement direction position controller 32 for driving the measurement probe or gauge unit along the reference datum provided by the traverse unit 9 in the measurement direction at an angle γ to the x-axis and an interferometric z displacement provider 35 for providing a measure of the z displacement of the stylus tip 12 as the stylus arm 11 follows the surface being measured during movement of the traverse unit 9 along a measurement path in a direction at an angle γ to the x-axis.

If rotation of the turntable is automated, then the metrological apparatus will also comprise an α (where α represents the angle of rotation of the turntable 16 about its spindle axis) position controller 38 for controlling rotation of the turntable 16. Similarly, if the attitude of the traverse unit 9 is adjustable and this adjustment is automated, then a γ position controller 36 will be provided for changing the attitude γ of the traverse unit 9. α and γ position providers 39, 37 (which may for example be shaft encoders, for example optical shaft encoders, or a linear grating type position provider) are provide to supply signals respectively indicating the angle α and γ to the DAPU 30. Generally the interferometric z displacement provider 35 will be provided within the traverse unit 9.

The measurement direction position controller 32 is associated with a position provider 34 that may be, for example, a shaft encoder associated with a motor providing the position controller 32 or may be a linear grating type of transducer. The column drive 31 may also be associated with a column z position provider 33 (shown in phantom lines in FIG. 4a), for example a shaft encoder associated with a motor providing the column drive 31, or the column z position may be determined in an open loop manner directly from the column motor drive signal. As show in FIG. 4a, the column drive 31 and position controller 32 (and other controllers if present) are coupled to the control apparatus 3 (via a link 13b and appropriate interfaces, not shown) for control by instructions from the control apparatus 3. At least some of these instructions may be supplied by the user.

The processing unit is programmed by program instructions to enable carrying out of measurements. FIG. 4b illustrates the functionality that may be provided by such programming In the example shown in FIG. 4b, programming of the processing unit 13 provides a data processor 50 comprising: a data receiver 51 for receiving data from the metrological instrument 2, a data storer 52 for storing data; a data preconditioner 53 for filtering received data to eliminate noise and other unwanted variations; a data transformer 54 for enabling an entire data set to be rotated or translated with respect to another data set; a data aligner 55 for aligning one data set to another using, in this example, a least-squares fitting procedure; and a data merger 56 for stitching or fusing together two sets of data so as to form a single continuous data set. The data processor 50 also comprises a user input receiver 57 for receiving user input from the keyboard 22 or pointing device 23 and an output provider 58 for providing output data to at least one of the display 21, the printer 24 and the communications device 25, if present. The data processor 50 further comprises a controller 59 for controlling overall operation of the data processor.

The data transformer 54 may enable automatic rotation and translation of data sets in accordance with data representing the γ and α angles (determined by the respective position providers 37 and 39, if provided, or input by the user) and the measurement direction position data logged by the DAPU 30. In this example, however, the data transformer 54 operates in conjunction with graphics processing provided by the computing apparatus (or itself incorporates such graphics processing) to enable data sets to be translated and rotated on screen by an operator using the pointing device 23 or keyboard 22.

Measurement Probe

The measurement probe or gauge unit is in this example the measurement probe used in the instruments supplied by Taylor Hobson as the Form Talysurf PGI series and is described in detail in U.S. Pat. No. 5,517,307 (the whole contents of which are hereby incorporated by reference) to which reference should be made for further information. In particular the measurement probe or gauge unit is based on Taylor Hobson's Form Talysurf PGI 1240 metrological instrument, described in the brochure produced by Taylor Hobson entitled "Form Talysurf PGI 1240, Aspherics Measurement system". This Form Talysurf PGI series of metrological instruments is particularly suited to measuring the surface form (and also roughness) of surfaces having significant form because, as described in U.S. Pat. No. 5,517,307, the interferometric z displacement provider 35 uses a curved diffraction grating that has a radius of curvature which is coincident with the axis about which the stylus arm pivots to provide more accurate z displacement measurements over a longer range.

FIGS. 5 and 6 illustrate an example of such a measurement probe in greater detail. Thus, in this example, the measurement probe 10 has a light source 310 comprising a laser diode of wavelength approximately 670 nm, and a collimating lens in the beam. The stylus 11 extends beyond a pivot bearing 121 in a portion 123 upon the end of which is mounted an optical component having a curved face, the curvature of which conforms to that of a circular arc centred at the pivot bearing 121. On the curved face is provided a diffraction grating comprising a plurality of parallel diffracting features inclined parallel to the pivot 121. Light from the light source 310 is directed straight through a prism 317, normally onto the surface of the diffracting grating 300. Two diffracted first order beams produced by the diffraction grating 300 enter the prism 317 which provides two output beams each of which passes through a respective output analyzer comprising a beam splitter prism. One beam splitter prism 340b is preceded by a quarter wave length plate 350. Provided on two faces of each analyzer beam splitter 340a, 340b are respective detectors 341a, 342a, 341b, 342b. Each detector comprises a photodiode responsive to the amplitude of light thereon to generate a corresponding electrical output signal. A lens 318 acts to converge the collimated beam from the light source 310 so as to reduce the divergence produced by the curvature of the diffraction grating 300.

Further provided, connected to the stylus 11, is a biasing force arrangement 400 comprising a linear electromagnetic coil 410 surrounding a linear magnetic armature or pole piece 420 connected to the support arm 123 so as to exert a pulling or pushing force thereon in accordance with the current supplied to the coil 410.

Typically, the beam produced by the laser diode and collimator lens is about 2 mm wide. The collimated beam passes through a halfwave thickness transparent plate 319 provided to enable adjustment of the polarization direction of the beam. The light beam is directed through a cylindrical shaped lens 318 which converges the collimated beam. In the absence of the cylindrical lens 318, the collimated beam would, when diffracted by the convex curved diffraction grating 300, produce diverging diffracted output beams. By providing the cylindrical lens 318, a corresponding convergence in the input beam is provided so that the diffracted beams from the diffraction grating are collimated. The lens 318 may also correct any divergence or convergence in the beam from the light source 310.

A pair of first order diffracted beams is produced at an angle theta dependent upon the illuminating wave length lambda and the pitch or spacing between lines of the grating; for a pitch of 1200 lines/mm and illuminating wavelength of 670 nm, the diffraction angle theta relative to a normal axis to the grating is approximately 54°. The two diffracted beams enter the rear planar surface of the prism 317 and are refracted thereby by an amount dependent upon the refractive index thereof. The refracted beams each impinge upon a respective side face 320a, 320b of the prism and, provided the angle of incidence thereon is greater than the critical angle for total internal reflection angle for the material of which the prism is made, are reflected back towards the centre of the prism. The inclinations of the faces 320, 320b to the centre of the prism are equal and opposite so that the two beams meet the centre of the prism at the same point.

Disposed along the longitudinal centre plane of the prism is a dielectric layer 335 arranged, as is conventional, to respond to an incident light beam by transmitting a portion thereof in a first polarization plane and reflecting a portion thereof in a second polarization plane (the S and P polarizations).

The planar layer 335 therefore reflects a portion of each diffracted beam coincidentally with a transmitted portion of the other, to produce combined output beams. However, of each combined beam, the reflected and transmitted portions exhibit different polarization and their amplitudes are therefore not additive. Each beam leaves the prism 317 through an end face normally inclined to the beam path. One beam enters an analyzer 340a; the second enters a quarter wave plate 350 prior to entering an analyzer 340b.

Each analyzer 340 comprises a further beam splitting prism, each comprising a cubic prism cut along a diagonal plane, including a dielectric layer structure between the two halves thereof. The effect of the dielectric layer in the 45° diagonal plane of each analyzer is to act as a beam splitter, transmitting one portion of an incident beam and reflecting a second. The rotational orientation of the diagonal plane of each beam splitter 340a, 340b is so selected that each of the reflected and transmitted beams produced thereby includes an equal proportion of the S and P polarizations of the output beam from the prism 317, and hence an equal proportion of each of the diffracted orders from the diffraction grating 300. The beam splitter prisms 340a, 340b are therefore rotationally inclined at 45° to the planes of the prism 317 which they face. Conveniently, the beam splitter 340a is adhesively cemented to one end face of the prism 317, and the quarter wave plate 350 and beam splitter 340b are cemented in that order to the other.

A photodetector (for example, a photodiode) 341a, 341b is provided to receive the reflected beam from each respective analyzer 340a, 340b and a further detector 342a, 342b is provided to receive the transmitted output from a respective beam splitter 340a, 340b. The reflected output in each case is phase shifted by 180° due to the reflection.

Further explanation of such a measurement probe as may be suitable for use with the present invention may be found as discussed in U.S. Pat. No. 5,517,307, the whole contents of which are hereby incorporated by reference.

Measuring Rotationally Symmetric Components

It may be possible for the stylus to traverse an entire measurement path. Where this is not possible, for example because of the form of the surface being measured, then it will be necessary to combine measurement data from separate measurements on different parts of the measurement path. Examples of methods for doing this are described below with reference to FIGS. 7 to 9c for cases where the workpiece is a rotationally symmetric component such as an aspheric lens mould for an aspheric lens to be used in, for example, a digital camera, a mobile telephone (cell phone) camera or DVD recorder, that is a mould for a very small (typically less than 10 millimeters) aspheric lens, and where the component or workpiece under test is the aspheric lens itself. It will however be appreciated that the component or workpiece may be any component or workpiece whose form is to be determined although the metrological instrument is particularly advantageous for use where the stylus needs to be tilted to enable the gradient of the surface to be within acceptable parameters or to facilitate access to a concave or recessed surface.

A first method of measuring the profile of a measurement path across a surface of an aspheric lens mould will now be described with reference to FIG. 7 which is a flow chart illustrating processes carried out by the data processor 50 and FIGS. 8a to 8c which show schematic representations illustrating the orientation of a lens mould 60 for respective different measurements taken during the measurement operation. The black dots D in FIGS. 8a to 8c are provided simply to identify one side of the mould to enable the fact of rotation of this rotationally symmetric body to be evident in the Figures.

It is assumed that the centering and levelling turntable 16 support assembly has already been precisely positioned on the base 5. Therefore, initially a set up procedure comprising a cresting process is carried out to align the component or workpiece 60 on the support platform 47. The set up procedure may also involve the operator identifying the end points of the measurement path 61 across the mould. Where access to the recessed mould surface is difficult, then the set up procedure may be carried out using a setup component that has the same dimensions and form as the mould surface but is convex rather than concave.

Once the set up procedure has been completed, the operator instructs (via the keyboard 22 and/or pointing device 23) the control apparatus of the metrological instrument to cause a reference measurement procedure to be carried out on a central reference section 61c of the measurement path 61. The reference section 61c is chosen so that it includes the reference axis of the component 60, that is in this case the axis of rotational symmetry 70 of the lens mould. As the traverse unit 9 moves the stylus tip 12 over the central section 61c, the interferometric z displacement provider 35 provides to the DAPU 30 reference section data representing the change in z displacement of the stylus tip 12 with x along the reference section 61c.

At S1 in FIG. 7, the data receiver 51 of the data processor 50 receives the reference section data from the DAPU 30. The controller 59 causes this data to be stored by the data storer 52 so that, at the end of the reference measurement procedure, the data storer 52 stores a reference data set representing the measurement over the reference section. The controller 59 then causes the output provider 58 to advise the user via the display that the reference measurement has been completed.

In this example, the operator then instructs (via the keyboard 22 and/or pointing device 23) the control apparatus of the metrological instrument 1 to cause a first measurement procedure to be carried out on a first measurement section 61d of the measurement path 61 starting from just to the left of the axis 70 to just beyond one edge 61a (in this example, the intersection between the lens shape surface and the bounding surface or "wing" 62a of the mould) of the measurement path 61 so that the first measurement section 61d overlaps with the closest end of the reference section 61c. As the traverse unit 9 moves the stylus tip 12 over the first measurement section, the interferometric z displacement provider 35 provides to the DAPU 30 first measurement section data representing the change in z displacement of the stylus tip 12 with x along the first measurement section 61d.

At S2 the data receiver 51 of the data processor 50 receives the first measurement section data from the DAPU 30 and the controller 59 causes this data to be stored by the data storer 52. At the end of the first measurement procedure the data storer 52 stores a first measurement section data set representing the measurement over the first measurement section.

The controller 59 then causes the output provider 58 to advise the user via the display that the first measurement section measurement has been completed.

In this example, the operator then manually rotates the turntable 16 through an angle α of 180 degrees to the orientation shown in FIG. 8b. The operator then instructs (via the keyboard 22 and/or pointing device 23) the control apparatus of the metrological instrument which causes a second measurement procedure to be carried out on a second measurement section 61e of the measurement path 61 starting from just to the right (left in FIG. 8c because of the rotation) of the axis 70 and extending to just beyond the other edge 61b (in this example, the intersection between the lens shape surface and the bounding surface or "wing" 62b of the mould) of the measurement path 61 so that the second measurement section 61e overlaps with the closest end of the reference section 61c.

As the traverse unit 9 moves the stylus tip 12 over the second measurement section 61*e*, the interferometric z displacement provider 35 provides second measurement section data representing the change in z displacement of the stylus tip with x along the second measurement section 61*e* to the DAPU 30.

At S3 the data receiver 51 of the data processor 50 receives the second measurement section data from the DAPU 30 and the controller 59 causes this data to be stored by the data store 52. At the end of the second measurement section measurement procedure, the data storer 52 stores a second measurement section data set representing the measurement over the second measurement section 61*e*. The controller 59 then causes the output provider 58 to advise the user via the display that the second measurement has been completed.

As can be seen from FIGS. 8*a* to 8*c*, the first and second measurement path sections overlap not only the reference path section but also each other.

Once the controller 59 determines that the three measurement data sets have been obtained and stored, the controller 59 may instruct the data pre-conditioner 53 to pre-condition the data at S4 by, for example, filtering to remove noise or variations due to environmental conditions or contamination. In this embodiment, an alternating sequence ball filter is used to suppress asperities prior to the data fitting procedures described below. As thus described, the filter is a software filter implemented by the data processor. The filter may, however, be implemented in hardware within the DAPU 30 before the data is supplied to the control apparatus 3, in which case the data pre-conditioner shown in FIG. 4*b* and the procedure S4 in FIG. 7 will be omitted. In this example, the data receiver or acquirer is provided by a graphics package supplied by Taylor Hobson under the trade name μLTRA for use with, amongst others, the Form Talysurf P01 series of instruments.

The data processor 50 provides a graphical user interface (GUI) that enables measured data sets to be displayed on the display 21 as graphical traces showing the z data provided by the interferometric z displacement provider 35 plotted against the x data logged by the x position provider 34. In this example, the graphical trace of the reference data set will be referred to as "the datum trace" while the trace provided by the first measurement section data set will be referred to as the "RHS trace" where RHS stands for right hand side and the trace provided by the second measurement section data set will be referred to as the "LHS trace" where LHS stands for left hand side.

In this example, the operator uses the keyboard 22 and/or pointing device 24 to instruct the controller 59 via the graphical user interface first to display the datum trace that is the profile of the reference data set. When the user input receiver 57 of the data processor 50 receives such an instruction, the controller 59 causes the output provider 58 to display the reference data set as a datum trace. The operator then uses the keyboard 22 and/or pointing device 24 to instruct the data processor 50 via the graphical user interface to display the first measurement section datum as the RHS trace together with the datum trace.

The graphical user interface (GUI) of the data processor 50 provides, as is well known for graphics packages, user operable controls that enable mirroring (reflection), rotation and translation of a selected displayed object, a graphically represented trace in this case.

The operator roughly aligns the RHS trace to the datum trace by eye by selecting the RHS trace and using the user operable controls of the GUI to move and/or rotate the entire RHS trace as a single body by translating the trace in the x- and z-directions and rotating the trace about an axis in the y-direction (this is perpendicular to the display screen) so that it is approximately aligned with the datum trace. Thus the graphical display enables an initial rough alignment to be effected by eye.

The controller 59 then instructs the data transformer 54 to effect a transformation on the first measurement section data set to transform (S5 in FIG. 7) the first measurement section data set in accordance with the transformation of the RHS trace by the operator. The data storer 52 stores the transformed first measurement section data set.

The operator then instructs the controller 59 to cause the data aligner 55 to align the transformed RHS trace to the datum trace, that is to align the stored transformed first measurement data set to the reference data set. Thus, at S6 in FIG. 7, the data aligner 55 uses a known alignment procedure such as a least-squares fitting procedure that adjusts the rotation and x and z positions of the RHS trace until the least squares error is a minimum, at which point the RHS trace is considered aligned to the datum trace. The controller causes the data storer 52 to store the transformed and aligned first measurement data set.

The operator then instructs the data processor 50 via the graphical user interface to display the second measurement section datum as the LHS trace together with the datum trace. The operator then uses the user operable controls of the GUI first to mirror or reflect the LHS trace. The operator then aligns the mirrored LHS trace roughly to the datum trace by eye in the manner described above for the RHS trace. This causes the controller 59 to instruct the data transformer 54 at S7 in FIG. 7 to reflect and transform the second measurement section data set in accordance with the reflection and transformation of the LHS trace by the operator. The controller 59 causes the data storer 52 to store the reflected transformed second measurement data set.

The operator then instructs the controller 59 to cause the data aligner 55 to align the reflected and transformed LHS trace to the datum trace, that is to align the stored reflected and transformed second measurement data set to the reference data set. The data aligner 55 thus at S8 in FIG. 7 uses the alignment procedure discussed above with respect to S6 to align the reflected and transformed LHS trace to the datum trace. The controller causes the data storer 52 to store the reflected, transformed and aligned second measurement data set.

The RHS and LHS traces (that is the first and second data sets) have thus now been independently aligned to the datum trace (that is the reference data set). In this example, the reference data set is not used in the remaining processes required to produce the profile.

Once the LHS trace has aligned to the datum trace then, at S9, under instruction from the controller 59, the output provider 58 displays the aligned and transformed RHS trace and the aligned, reflected and transformed LHS trace.

The controller 59 then causes the data merger 56 at S10 to merge the overlapping areas of the aligned first and second data sets. There are numerous ways of merging the two data sets. In one example, the final data set representing the profile includes points from both measurement data sets in the overlap region without modification so that traversing the centre of the profile from the left the data points come alternately from the LHS and RHS traces. The total number of data points in the final data set is equal to the sum of the data points in both data sets. Another approach is to replace the points in the overlap region with estimated values based on a weighted average of the data. This will reduce the number of points in the final data set and will smooth out some of the apparent "noise" in the central region caused by the simple merging technique.

Physical parameters of the component, for example the roughness parameter Ra, or peak-to-trough profile height R1 may be determined from the merged profile Such parameters can be used in a quality assurance process, for comparing the measured parameters with the nominal manufactured values for a component.

The profile of an aspheric component is typically represented by a polynomial equation. It is possible to determine the error between the measured profile and the expected polynomial profile by removing the expected polynomial form using, for example, the above-mentioned the μLTRA software package.

As another possibility, the LHS and RHS traces may be recorded without the reference data set and the overlapping portions of the LHS and RHS traces are used to align the LHS and RHS traces, for example, by using a constrained least squares fitting algorithm.

As another possibility, the LHS and RHS traces may be taken not only over first and second measurement portions 61$d$, 61$e$, but also over flat, or land, portions 62$a$, 62$b$ adjacent the curved surface of interest of component 60, this will result in LHS and RHS traces corresponding to traces 61$g$ and 61$h$ (shown in phantom lines in FIGS. 8$b$ and 8$c$). Subsequently, the flat portions of the LHS and RHS traces may be aligned to be coaxial, for example, by manual alignment, or using an alignment algorithm, for example a least squares fitting algorithm. The LHS and RHS traces may then be translated relative to one another in a direction parallel to their flat portions in order to fully align the LHS and RHS traces. This may be effected manually, or via a fitting algorithm, for example a constrained least squares algorithm.

In the examples given above, the component had a concave surface to be measured. FIGS. 9$a$ to 9$c$ show figures equivalent to FIGS. 8$a$ to 8$c$ for a convex aspheric surface 610 of a component 600 such as an aspheric lens that may be used in a digital camera, mobile telephone or an optical storage device such as a DVD recorder. The method described above with reference to FIG. 7 may be used on this component in which case the first and second measurement path sections and the reference path section are represented in FIG. 9$a$ by lines 610$d$, 610$e$ and 610$c$, respectively. The second method described above may also be used where, as shown in FIGS. 9$a$ to 9$c$ the component is securely mounted on a glass flat 700. In this case, the parts 710$a$ and 710$b$ of the glass flat bounding the component take the place of the wings or flats of the mould and the reference paths are shown by the dashed lines 610$f$ and the first and second measurement paths by the dashed lines 610$g$ and 610$h$ in FIGS. 9$a$ to 9$c$. The black dot D is again provided to enable the rotation to be seen.

An explanation of one type of data stitching that may be employed with the present invention may be found in GB2, 422,015, the whole contents of which are hereby incorporated by reference.

As one possibility, a first pair of LHS and RHS traces as described above may be taken at a first rotational angle α of turntable 16 and turntable 16 then rotated through a known angle about its spindle axis and a subsequent pair of RHS and LHS traces taken. A plurality of RHS and corresponding LHS traces may then be combined to provide a reconstructed three-dimensional representation of the workpiece. Such an approach may be used, for example, to determine astigmatic errors in a lens or to analyse general three-dimensional form errors of a component.

Alignment of the Workpiece and the Stylus

As will now be explained with reference to FIGS. 10$a$ to 10$c$, when measuring a rotationally symmetric workpiece, it is important to centre accurately the axis of rotational symmetry of the workpiece so that it lies in the two-dimensional measurement plane described by the stylus tip 12 as it traverses a measurement path across a workpiece.

If a workpiece 810 has its axis of rotation centred upon the spindle axis 814 of the turntable upon which it is mounted (not shown in FIGS. 10$a$ to 10$c$) so that it lies within the two-dimensional measurement plane, then, when the measurement probe traverses the surface of workpiece 810, it will follow a path along line 812 of FIG. 10$a$ and will record a first profile 818 as shown in FIG. 10$b$. However, if the axis of rotational symmetry of the component does not lie within the two-dimensional measurement plane but is instead, say, offset in the y-direction by a y-position error 820, then, when the measurement probe traverses the surface of workpiece 810, it will follow a path along line 816 of FIG. 10$a$ and will record a second profile 822 as shown in FIG. 10$c$. Due to y-direction curvature of the workpiece 810, the first and second profiles 818 and 822 may differ substantially. If, as described above, a plurality of corresponding RHS and LHS profiles are recorded with the workpiece in different rotational positions, then the reconstructed form of the workpiece may be substantially different to the workpiece's physical form. Likewise, a rotational difference that causes the axis of rotational symmetry to lie outside the two-dimensional measurement plane may result in a reconstructed form that departs significantly from the workpiece's true form.

Thus, if the 2D (two-dimensional) measurement plane does not cut through the rotational axis (the optical axis in the case of a lens) then the measurement result will be distorted. Accordingly, the axis of rotation of the workpiece needs be aligned to the two-dimensional measurement plane. Where the rotational axis (the optical axis in the case of a lens) cannot be directly aligned to the 2D measurement plane, then alignment is achieved indirectly by aligning the rotational axis to the turntable spindle axis A and aligning the two-dimensional measurement plane to the turntable spindle axis.

Alignment of the Rotational Axis to the Spindle Axis

This is achieved by use of the centering and levelling mechanism of the turntable described above which allows movement in four degrees of freedom (two rotational and two translational). This alignment is effected by first measuring the alignment error using the measurement probe and then driving the centering and levelling mechanism to remove this error.

Alignment of the 2D Measurement Plane to the Spindle Axis

As shown in FIGS. 13$a$ and 13$b$, a first alignment adjusts the gauge attitude 1310 and would typically be carried out by a service engineer as part of the instrument setup. A second alignment 1312 translates the gauge in the y-direction and would typically be carried out by the user on a daily basis or whenever the stylus is changed or knocked. y-direction realignment may be required relatively frequently in some circumstances to compensate for, for example, any instability of the stylus/gauge interface, pad wear on the column 7 and/or traverse unit 9 as well as changes in ambient temperature and changes in local temperature, for example on the datum pads due to friction.

Manual Alignment

In order to manually adjust the y-direction, a user would typically cause the stylus to contact the workpiece and then cause the measurement probe to be driven in the measurement direction (which would coincide with the x direction where γ is zero) to obtain measurement data from which the crest (maximum or minimum z reading along the measurement path) in the measurement direction may be determined. The measurement probe and thus the stylus is then translated in the y-direction (generally this would be done manually) to obtain measurement data from which the crest in y-direction may be determined.

There are a number of limitations associated with such a manual alignment. Firstly, the measured crest of the component in the y-direction will seldom coincide with its axis of rotational symmetry as the y-direction crest is dependent upon the angular alignment of the component relative to the y-direction translation stage as opposed to the angular alignment of the part relative to the two dimensional measurement plane. FIG. 11 shows very diagrammatically how an error 1110 in the alignment of the y-direction translation stage 1112 results in a y-direction crest 1114 being determined that differs from the true crest 1116 of the component. To give an idea, if, for example, a component has a base radius of 2 mm, the y-direction translation would need to be square to the axis of rotational symmetry of the lens to within 0.03 degrees in order to produce a cresting error of 1 μm or less. For larger base radii the y-direction translation would need to be even more accurately aligned to the axis of rotational symmetry in order to achieve a 1 μm or less cresting error.

Secondly, and by way of example with reference to FIG. 12, if a component 1210 has a base radius of 2 mm, a 1 μm cresting error 1212 will relate to a vertical movement of 1 nm 1214. Therefore, to align the y-direction position to an accuracy of 2 μm using the above-described manual y-direction adjustment approach, a user would have to detect the y-direction turning point of the gauge to within 0.25 nm which is impractical. This example assumes that the form of the component is spherical. If the component is aspheric and has large local radii then these problems will be exacerbated.

Thirdly, because the stylus is crested over the component and then the component is measured, rotated and re-measured, if the component is not perfectly aligned with the spindle axis, then the stylus will be off crest when carrying out all but the first measurement. This can be mitigated either by aligning the axis of rotational symmetry of the part to the spindle axis and taking account of the alignment error when calculating the total cresting error, or by re-cresting before each measurement is taken.

Fourthly, it is possible that intrinsic stiffness of the stylus in the y direction may cause the stylus to drag on the workpiece which will produce errors, although it may be possible to carry out a calibration procedure to compensate for these errors.

Automated Alignment

If a motorised y stage is provided then the user would drive the stylus in the y-direction to obtain y-direction measurement data which could then be analysed to determine the turning point (maximum or minimum z) and so the crest of the component. This approach is less susceptible than the manual approach to the second limitation set out above as automation may provide for greater y-direction positioning and improved localisation of the y-crest position—for example by way of curve fitting or interpolation. However, this approach would still be susceptible to the other three limitations outlined above.

Alignment Using an Artefact

A way of addressing the issues described above with alignment of the 2D measurement plane to the spindle axis will now be described which involves the use of an artefact or calibration component that has a non-rotationally symmetric calibration surface, in the example to be described below a plane or flat surface which is inclined to the z axis. This enables measurement of the alignment error and separate adjustment of that error and addresses most of the problems of the manual and automatic alignment methods described above.

An example of this method will now be described with reference to FIGS. 14 to 18d the flow chart shown in FIG. 14.

The artefact is placed by the operator on the indexing spindle of the turntable 16 at T2 in FIG. 14 after alignment of the stylus tip to the spindle axis in the x direction has been achieved (for example by centering a standard calibration ball on the spindle axis and then determining the crest position of the ball).

FIGS. 18a to 18d show an example artefact 1810. In this example, the artefact 1810 has a neck portion 1811 having a plane surface 1812 that is inclined with respect to its base portion 1816 at an angle δ. Artefact 1810 also has a collar portion 1814 coupling base portion 1816 to neck portion 1811. As can be seen from FIGS. 18b and 18c, base portion 1816 has a number of locating holes for enabling location on the indexing spindle of the turntable.

Figure 17B:
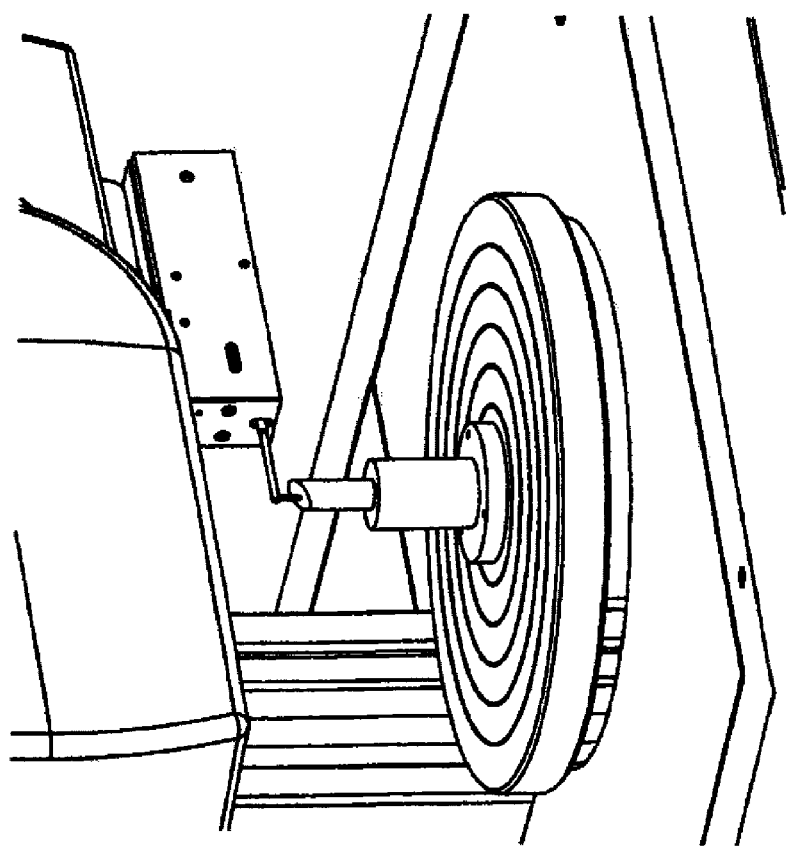

At T3, the user causes the maximum slope of the inclined plane 1412 of artefact 1410 to lie approximately in the x-direction as shown in FIG. 17a. As one possibility, the alignment of T3 could be performed by eye by a user. Although, the plane 1412 may be aligned to have a negative gradient in the x-direction in FIG. 1, a person skilled in the art will appreciate that plane 1412 could also be aligned so as to have a positive gradient in the x-direction (as shown in FIG. 17b).

At T4, the stylus is caused to traverse the plane 1412 to obtain measurement data (a "trace") in the measurement direction and the turntable 16 is then rotated to obtain measurement data at one or more different degrees of rotation of the turntable about the spindle axis. For example, a first trace may be taken without rotating turntable 16, and then a number of traces may be taken with turntable 16 rotated respectively to positions 0.5°, 1.5° . . . 10° from that of the first trace; the turntable may then be returned to the rotational position of T3 and additional traces may be taken with turntable 16 rotated to respective positions −0.5°, −1.5° . . . −10° away from that of T3. The trace having the maximum (or minimum) slope or gradient would then correspond to the angular position at which maximum gradient of the plane surface 1412 is aligned with the x measurement direction. The accuracy of this alignment would be at least the size of the angle of rotational increment between each of the plurality of rotational positions at which the traces were recorded—in the above example 0.5°.

Figure 17C:
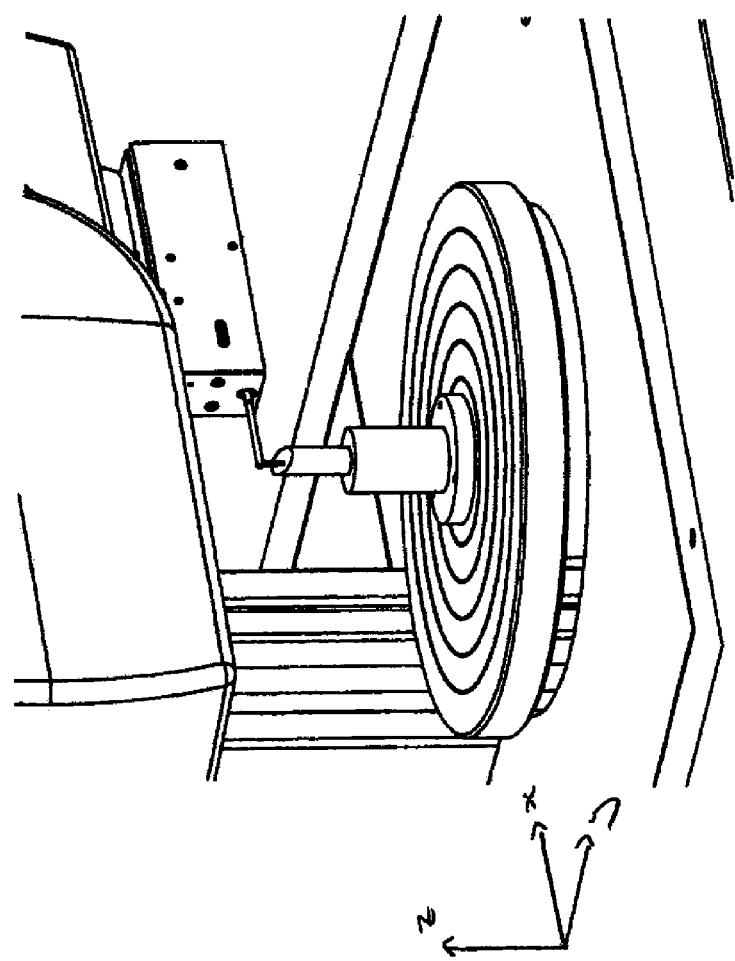
Figure 18A:
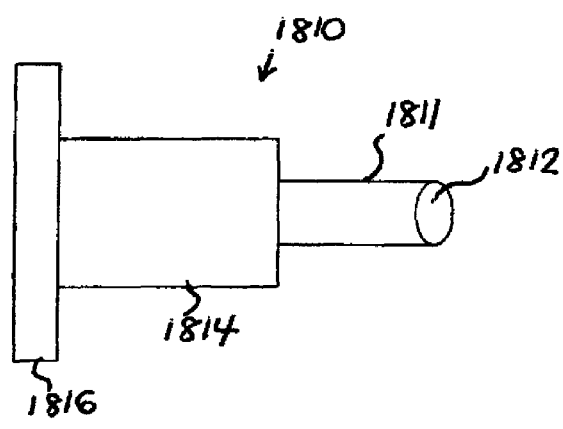
Figure 18B:
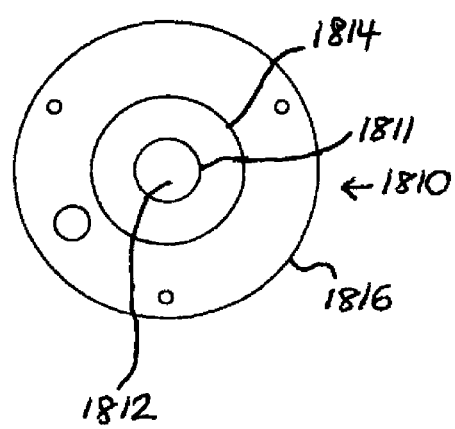
Figure 18C:
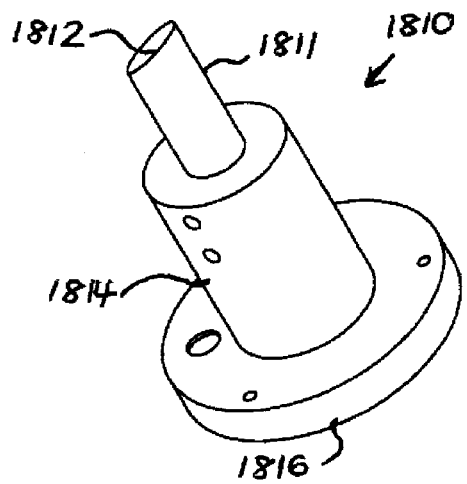
Figure 18D:
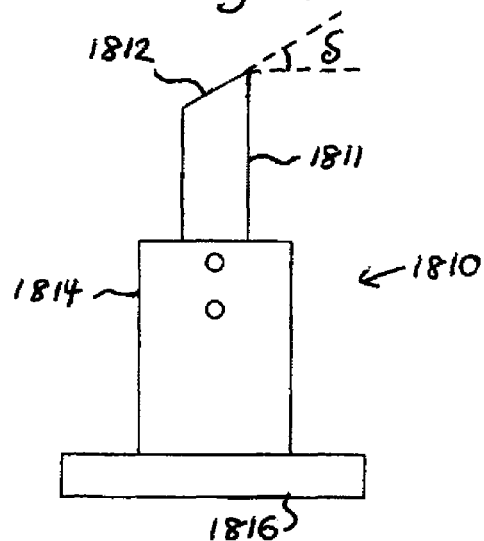

At T5, turntable 16 is rotated by 90° from the position where the maximum slope of the inclined plane 1412 of the artefact is aligned with the x axis to bring the maximum slope of inclined plane surface 1412 parallel with the y-direction—as shown in FIG. 17c. FIGS. 15a and 15b show in solid lines artefact 1410 in this first rotational position. A measurement of the z displacement of stylus tip 12 is then taken at T6.

Turntable 16 is then be rotated by 180° at T7 to bring artefact 1410 into a position as shown in phantom lines in FIG. 15a (see also FIG. 17d) and then at T8 a measurement of the z displacement of stylus tip 12 is taken at this second rotational position.

If stylus tip 12 is aligned perfectly to the spindle axis in the x and y directions then the z position of the stylus tip will not change when turntable 16 is rotated at step T7 and the measurements taken at steps T6 and T8 will be equal. However, and as illustrated by FIG. 16 which shows the stylus tip 12 at the first rotational position in phantom lines and at the second rotational position in solid lines, if the stylus has an alignment error in the y direction then there will be a change in the z position of the stylus tip and thus in the gauge reading. There is relationship between the change in gauge reading 1610 and the translational alignment of the stylus tip to the spindle axis 1612 which may be characterised as follows:

$$\text{cresting error} = \text{change in gauge reading}/(\text{Tan(artefact angle)} \times 2) \quad [1]$$

If the artefact had a plane inclined at 45 degrees to the x axis, the movement of the gauge would be approximately twice the cresting error. However, to reduce side forces on the stylus tip 12, a 30 degree incline to the x axis may be preferred—such an artefact would also have the following cresting error:

$$\text{cresting error} = \text{change in gauge reading} \times 0.866 \quad [2]$$

At T9, a correction parameter is calculated from the measurements taken at steps T6 and T8.

At T10, the probe 10 is moved in the y-direction in accordance with the correction parameter to the corrected y-position. Readings from the probe 10 may be used to check that the probe 10 has been moved to the required position; for example, if the corrected position lies midway between the two measurements taken at steps T6 and T8, the y-position of the probe may be adjusted until the probe reading corresponds to the average of the T6 and T8 readings.

As one possibility, if the initial measurements taken at steps T6 and T8 differed by a large amount, the process may then be repeated in an iterative manner, by returning to step T6.

The main errors in this method of performing y-direction alignment using an inclined artefact arise from errors (Xc) in the x-direction centering of the stylus tip 12 on the spindle axis and errors (Rinc) in the rotational alignment of the inclined plane 1412 with the y-direction. The y-direction positioning error (Ypos_err) may be characterised as follows:

$$Y\!pos\_err = Xc \times \text{Sin}(Rinc) \quad [3]$$

For routine surface measurements on aspheric lenses, preferably Xc is less than 40 μm and Rinc is less than 1°—thus giving Ypos_err<0.7 μm.

The advantages of the inclined artefact approach over the manual and automatic approaches discussed above will now be detailed with reference to their above-listed limitations. Firstly, the inclined slope or measurement surface amplifies the error and provides a much greater error signal between the first and second rotational positions than would a calibration sphere which is nominally centred on the spindle axis (and so would be close to flat at the spindle axis). Also, as the inclined artefact does not have a turning point in the y-direction over which measurements are taken, alignment of the artefact's axis of rotation will have no effect on the alignment error. Also, because the amplification of the error enables better alignment in y, the cresting errors that arise when making measurements on components having large local radii are reduced. Thirdly, as this approach produces greater accuracy that the manual or automated approaches, once the y-position adjustment has been made, the need for repeated realignment or recresting is reduced. Fourthly, the slope of the artefact can be small enough (e.g. 30° as mentioned above) to avoid significant side forces on the stylus tip 12. Additionally, as the two measurements taken at steps T6 and T8 of FIG. 14 are taken with the inclined plane rotated by 180°, deflection of the stylus arm 11 due to contact of the stylus tip 12 with the inclined surface will be in opposite directions for the two readings. Accordingly the deflections will cancel when an average of the two readings is taken.

In this example the traverse reference datum, that is the direction in which the measurement probe is moved during a measurement operation, extends parallel to the inclined slope or measurement surface of the artefact.

As one possibility, instead of using an artefact having an inclined plane, the same approach could be used with an artefact positioned on the turntable 16 so that the z-direction profile of the measurement surface is not symmetric about the spindle axis in the y-direction. An example of such an artefact would be an off-centred sphere, hemi-sphere or cone, or any artefact having a measurement surface that is non-regular or that is not symmetric in y. These may increase the complexity of the calculation to determine the correction parameter. In some examples the method may be iterative with the stylus tip 12 being moved to a position intermediate the positions measured at T6 and T8. In one example the stylus tip 12 may be moved to the middle point of the measurements taken at T6 and T8 and the iterative process stopped when the difference between those measurements fell below a predetermined threshold. As another possibility, interpolation across multiple iterations could be employed to reduce the number of iterations required.

Centering and Levelling of Rotationally Symmetric Components

Referring now to FIGS. 19*a* to 19*d*, and as will be described below, features of a rotationally symmetric component or workpiece may be employed to determine how to centre the component on a turntable.

Figure 19A:
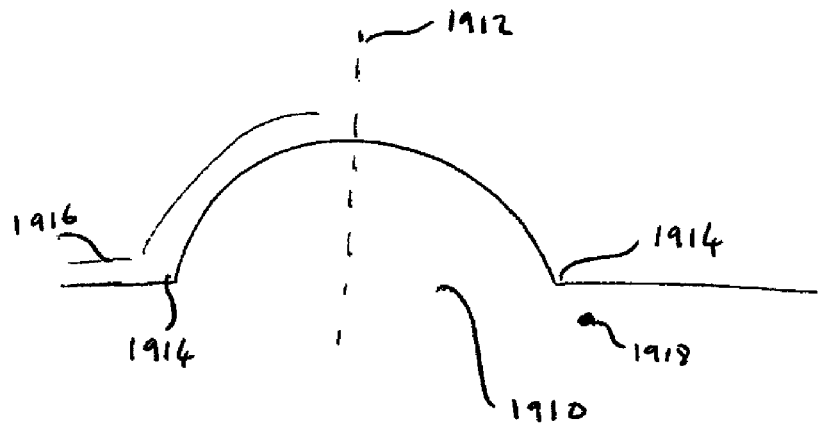
Figure 19B:
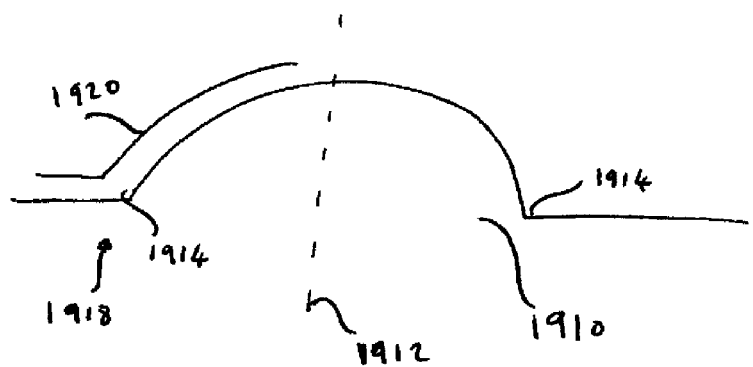

As can be seen in FIG. 19*a*, a component 1910 (in this case a lens) which is rotationally symmetric about an axis 1912 has features 1914 upon which alignment may be performed and is positioned on a centering and levelling stage on a turntable (not shown) of a surface measurement instrument. In the example shown in FIGS. 19*a* to 19*d*, the lens has an annular discontinuity which forms the feature 1914.

Figure 19C:
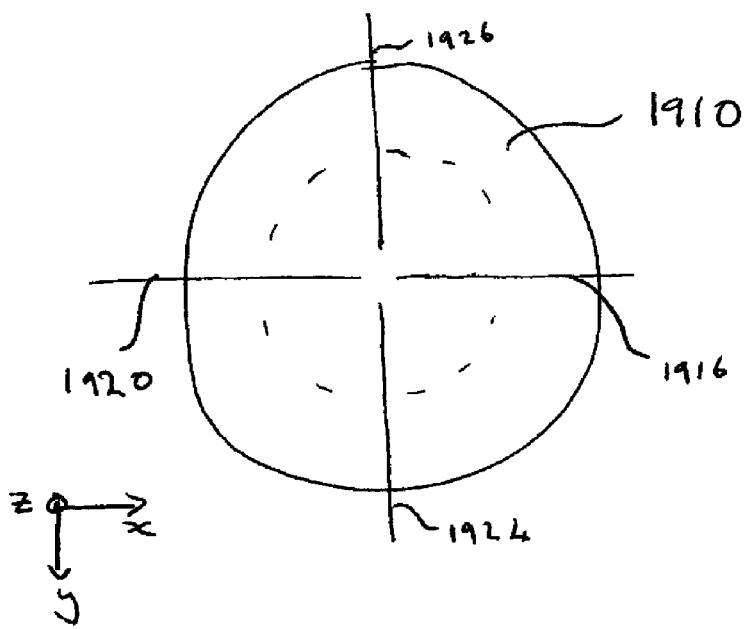

A trace 1916 is then taken by the surface measurement instrument. For clarity, component 1910 has been shown in FIGS. 19*a* and 19*b* with a mark 1918 to identify the component's rotational position. The component 1910 is then rotated by 180° on the turntable (as can be seen by the relative position of mark 1918 between FIGS. 19*a* and 19*b*), and a second trace 1920 is taken over feature 1914—FIG. 19*c* shows a top plan view of component 1910 to indicate the location of traces 1916 and 1920 on component 1910.

If the axis of rotational symmetry 1912 of component 1910 (the optical axis in the case of a lens) is aligned with the spindle axis of the turntable, traces 1916 and 1918 will exactly coincide; otherwise however, traces 1916 and 1920 will be unaligned—as shown in a very exaggerated manner in FIG. 19*d*. Calculation of the transformations required to align traces 1916 and 1920 to their midway position can hence be used to identify how to centre and level component 1910 by adjustment of the centering and levelling stage.

One way of identifying the transformation required to align traces 1916 and 1920 would be to perform an affine registration by optimising a similarity metric such as a distance measurement between the two traces—for example by using a least squares optimisation algorithm. This may be performed by moving both traces during the registration, but it is computationally more efficient to keep one trace fixed (say trace 1920) and then to register trace 1916 thereto.

In this case the registration will produce x- and z-direction translations and a rotation about a y-direction axis passing through the centre of the turntable 16; application of these parameters to trace 1916 would move it along arrow 1922 of FIG. 19*d* to become coincident with trace 1920. However, the location at which component 1910 would be centred with respect to the turntable lies midway between traces 1916 and 1920 and so these parameters should be halved. The halved parameters are then put in a transformation matrix and multiplied by a coordinate transformation matrix to bring them into the coordinate system of the centering and levelling table. Alternatively, the two pairs of measurement data may be transformed through a coordinate transformation matrix to bring them into the coordinate system of the centering and levelling table prior to an equivalent optimisation procedure differing in that a single lateral shift and rotation about a y-direction axis passing through the centering and levelling pivot are instead optimised. The centering and levelling table can then be adjusted accordingly to centre component 1910.

The above-described process would then be performed with the turntable offset by 90° and as shown in FIG. 19c with traces 1924 and 1926 taken on component 1910; this would then allow the centering and levelling stage to correct for x- and y-direction translations and rotations.

A person skilled in the art will appreciate that the above-described centering and levelling technique may be employed iteratively.

Modifications and Variations

A person skilled in the art will appreciate that a number of different methods of centering and levelling could be employed with the above-described techniques. For example, as one possibility, mechanical centering is used. It may be possible to use software centering and/or levelling, for example as described in U.S. Pat. No. 5,926,781, the whole contents of which are hereby incorporated by reference, which may enable omission of at least some of the centering and levelling mechanisms discussed herein.

Other forms of centering and levelling mechanism may be used. For example, it may be possible to use wedge assemblies of the type described in the Applicant's International Application Publication No. WO2007/091087, the whole contents of which are hereby incorporated by reference. Other levelling mechanism that do not use wedge assemblies may be used, for example, as discussed in U.S. Pat. No. 4,731,934, the whole contents of which are hereby incorporated by reference.

A person skilled in the art will appreciate that although the above description of the present invention has been described with reference to a surface form and measuring surface measurement instrument, the same approach could also be applied to a roundness measuring machine, for example the Talyrond (Registered Trademark) series 130, 131, 385, 395, or 450 machines of Taylor Hobson Limited, a division of Ametek Inc., and also to other such machines in which the y- and/or x-direction alignment of the stylus and the spindle axis may have a significant effect on accuracy.

A person skilled in the art will appreciate that the above-described methods could be applied not only to y-direction alignment, but also to x-direction alignment. In such a case, instead of the inclined plane of the artefact (or the varying z-direction profile of the artefact in the case of an artefact having an non-planar surface) being aligned with the y-direction for steps T6 and T8 of FIG. 14, they would be aligned with the x-direction (for example as in FIGS. 17a and 17b).

Similarly, the magnitude of any x-direction cresting error can easily be calculated using the inclined plane artefact. To do this, a user would rotate the turntable so that the direction of maximum slope of the inclined plane of the artefact was aligned with either the positive or negative x-direction. The user would then take a first measurement before rotating the turntable by 180° and subsequently taking a second measurement. The difference between the two measurements would then indicate the magnitude of the x-direction cresting error.

As another possibility, the alignment technique described herein may be employed to align the measurement column 7 in the y- and/or x-direction by taking measurements of an artefact with the column carriage 8 at different positions along the column 7 in the z-direction. This may be achieved by raising the artefact following the z-direction change of position of the column carriage 8—for example by placing it on blocks.

As a further possibility, the above-described alignment technique may be employed to align the stylus arm 11 at different positions in its range—this may be of particular use if the stylus arm 11 is employed at an angle γ to the horizontal—in such a case the different positions of the stylus arm's range may be aligned either by raising or lowering the artefact, or alternatively by raising or lowering the column carriage 8.

As another possibility, the y-position adjuster 101 may be disposed between the traverse unit 9 and the column carriage 8 so as to effect relative y-direction movement therebetween.

A person skilled in the art will appreciate that the methods and apparatus described herein need not be limited in their application to instruments for the measurement of aspheric, concave or convex surfaces, and may equally be applied to instruments for the measurement of other surfaces.

As one possibility, there is provided a computer program, computer program product, or computer readable medium, comprising computer program instructions to cause a programmable computer to carry out any one or more of the methods described herein.

Various features described above may have advantages with or without other features described above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of determining a correction parameter for use in effecting alignment of a component of a metrological apparatus in at least one direction, the method comprising:
   positioning an artefact on a support surface of the metrological apparatus;
   using moving a measurement probe of a measurement instrument in a measurement direction to make a first measurement of the measurement surface;
   effecting relative rotation of the measurement surface about a rotation axis such that a measurement surface of the artefact is asymmetric with respect to the rotation axis in the at least one direction;
   moving the measurement probe of the measurement instrument in the measurement direction to make a second measurement of the measurement surface after the rotation such that the location in the two directions orthogonal to the measurement direction of the second measurement is the same as that of the first measurement; and
   determining a correction parameter from the first and second measurements.

2. A method according to claim 1, wherein the effecting relative rotation, rotates through 180 degrees between the first and second measurements.

3. A method according to claim 1 wherein the measurement probe is movable in a traverse direction to enable measurement of surface variation in a direction perpendicular to the traverse direction thereby defining a measurement plane.

4. A method according to claim 3, wherein an angle of the traverse direction is adjustable.

5. A method according to claim 3, wherein the traverse direction extends obliquely of the plane containing the support surface of a turntable.

6. A method according to claim 1, wherein the measurement surface of the artefact is at an oblique angle to a direction in which surface variations are measured by the measurement probe.

7. A method according to claim 1 wherein the measurement probe is movable in a traverse direction to enable measurement of surface variation in a direction perpendicular to the traverse direction thereby defining a measurement plane; and the artefact has a planar measurement surface extending at an oblique angle to the measurement plane.

8. A method according to claim 1, wherein the measurement surface of the artefact has an axis about which it is symmetrical and that axis is offset from the rotation axis of the turntable.

9. A method according to claim 1, further comprising correcting the alignment of the component based on the determined correction parameter.

10. A method according to claim 9, further comprising repeating the first and second measurements after correcting the alignment of the component on the basis of the determined correction parameter to enable refinement of the correction parameter.

11. A computer program product comprising program instructions to program processor means to carry out a method in accordance with claim 1.

12. A method of determining an alignment correction parameter for centering a workpiece having first and second mirror image surface portions to a rotation axis of a turntable of a metrological apparatus, the method comprising:
measuring a form of the first surface portion at a first measurement position to provide first measurement data;
rotating the turntable to bring the second surface portion to the first measurement position;
measuring a form of the second surface portion at the first measurement position to provide second measurement data;
aligning the first and second measurement data using a feature of the form of the first and second surface portions; and
determining an alignment correction parameter based on results of the aligning.

13. A method according to claim 12, wherein the feature is a rotational discontinuity.

14. A method according to claim 12, wherein the feature is a rotational discontinuity defined by a rim of the workpiece.

15. A method according to claim 12, wherein the workpiece has mirror image third and fourth surface portions and the method further comprises:
measuring a form of the third surface portion of the workpiece at a measurement position to provide third measurement data;
rotating the turntable to bring the fourth surface portion of the workpiece to that measurement position;
measuring a form of the fourth surface portion at that measurement position to provide fourth measurement data;
aligning the third and fourth measurement data using a feature of the form of the third and fourth surface portions; and
determining another alignment correction parameter on the basis of the results of the aligning.

16. Metrological apparatus comprising:
a turntable;
means for determining a correction parameter for use in effecting alignment of a component of the metrological apparatus in at least one direction;
an artefact mounted on a support surface of the turntable of the metrological apparatus so that a measurement surface of the artefact is asymmetric with respect to a rotation axis of the turntable in the at least one direction;
a measurement probe to make measurements on the measurement surface in a measurement direction; and
means for rotating the turntable,
wherein the determining means is arranged to determine the correction parameter from a first measurement of the measurement surface by the measurement probe and a second measurement of the measurement surface by the measurement probe after rotation of the turntable such that the location in the two directions orthogonal to the measurement direction of the second measurement is the same as that of the first measurement.

17. Metrological apparatus comprising:
a turntable to support a workpiece having first and second mirror image surface portions;
means for measuring surface form;
means for rotating the turntable about a rotation axis;
control means for causing: the measuring means to measure a form of the first surface portion at a first measurement position to provide first measurement data, the rotating means to rotate the turntable to bring the second surface portion to the first measurement position, and the measuring means to measure a form of the second surface portion at the first measurement position to provide second measurement data;
means for aligning the first and second measurement data using a feature of the form of the first and second surface portions; and
means for determining an alignment correction parameter to centre the workpiece to the rotation axis based on results of the aligning.

18. Metrological apparatus comprising:
a rotatable turntable;
a processor for determining a correction parameter for use in effecting alignment of a component of the metrological apparatus in at least one direction;
an artefact mounted on a support surface of the turntable of the metrological apparatus so that a measurement surface of the artefact is asymmetric with respect to a rotation axis of the turntable in the at least one direction;
a measurement probe to make measurements on the measurement surface in a measurement direction; and
wherein the processor is arranged to determine a correction parameter from a first measurement of the measurement surface by the measurement probe and a second measurement of the measurement surface by the measurement probe after rotation of the turntable such that the location in the two directions orthogonal to the measurement direction of the second measurement is the same as that of the first measurement.

19. Metrological apparatus comprising:
a rotatable turntable to support a workpiece having first and second mirror image surface portions, wherein the a rotatable turntable is rotatable about a rotation axis;
a measurement probe for measuring surface form;

a control mechanism for causing:

the measurement probe to measure the form of the first surface portion at a first measurement position to provide first measurement data;

the rotatable turntable to rotate to bring the second surface portion to the first measurement position; and the measuring probe to measure the form of the second surface portion at the first measurement position to provide second measurement data;

the apparatus further comprising a processor configured to align the first and second measurement data using a feature of the form of the first and second surface portions and further configured to determine an alignment correction parameter to centre the workpiece to the rotation axis based on results of the aligning.

20. Apparatus according to claim 19, wherein the feature is a rotational discontinuity defined by a rim of the workpiece.

21. The metrological apparatus of claim 19 in which the turntable is fixed and the measurement probe is rotatable.

\* \* \* \* \*

UNITED STATES PATENT AND TRADEMARK OFFICE
CERTIFICATE OF CORRECTION

PATENT NO.        : 8,635,783 B2                                         Page 1 of 1
APPLICATION NO.   : 13/124547
DATED             : January 28, 2014
INVENTOR(S)       : McDonnell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 229 days.

Signed and Sealed this

Twenty-second Day of September, 2015

Michelle K. Lee
*Director of the United States Patent and Trademark Office*